(12) United States Patent
Welfare et al.

(10) Patent No.: US 11,918,155 B2
(45) Date of Patent: Mar. 5, 2024

(54) WATERLESS TOILET

(71) Applicants: Harry Welfare, London (GB); Iain Purves, London (GB); Marcus Comaschi, London (GB)

(72) Inventors: Harry Welfare, London (GB); Iain Purves, London (GB); Marcus Comaschi, London (GB)

(*) Notice: Subject to any disclaimer, the term of this patent is extended or adjusted under 35 U.S.C. 154(b) by 0 days.

(21) Appl. No.: 16/577,162

(22) Filed: Sep. 20, 2019

(65) Prior Publication Data

US 2021/0085134 A1   Mar. 25, 2021

(51) Int. Cl.
*A47K 11/02*   (2006.01)

(52) U.S. Cl.
CPC .................. *A47K 11/026* (2013.01)

(58) Field of Classification Search
CPC ....... A47K 11/02; A47K 11/026; A61F 5/441; E03D 9/05; B65G 39/12
USPC ............................................................ 4/484
See application file for complete search history.

(56) References Cited

U.S. PATENT DOCUMENTS

| | | | | |
|---|---|---|---|---|
| 3,648,302 A * | 3/1972 | Winters | ............... | A47K 11/026 4/484 |
| 3,693,193 A * | 9/1972 | May | .................... | A47K 11/026 141/114 |
| 3,878,572 A * | 4/1975 | Eriksson | ............. | A47K 11/026 4/484 |
| 3,908,336 A * | 9/1975 | Forslund | .................. | B65B 9/15 53/548 |
| 4,025,969 A * | 5/1977 | Dahlen | ............... | A47K 11/026 4/484 |
| 4,519,104 A * | 5/1985 | Nilsson | .................. | B65F 1/062 4/484 |
| 6,052,842 A * | 4/2000 | He | ....................... | A47K 11/026 4/484 |
| 6,101,641 A * | 8/2000 | Hawkins | ............... | A47K 11/02 4/449 |
| 8,239,973 B1 * | 8/2012 | Character | ............ | A47K 13/307 4/219 |
| 8,408,160 B1 * | 4/2013 | Pozin | ..................... | A01K 1/011 53/567 |
| 2006/0260028 A1 * | 11/2006 | Casale | ...................... | E03D 9/05 4/240 |
| 2009/0165196 A1 * | 7/2009 | Mochizuki | .......... | A47K 11/026 4/315 |
| 2009/0255045 A1 * | 10/2009 | Sakurai | ............... | A47K 11/026 4/484 |
| 2013/0125301 A1 * | 5/2013 | Natt | ....................... | A47K 11/02 4/484 |
| 2015/0052673 A1 * | 2/2015 | Kosovac | .................. | E03D 9/05 4/352 |
| 2016/0186420 A1 * | 6/2016 | Darnell | ..................... | E03D 9/05 4/352 |
| 2016/0347491 A1 * | 12/2016 | Shimanuki | ............. | B65F 1/062 |

(Continued)

*Primary Examiner* — Benjamin R Shaw
(74) *Attorney, Agent, or Firm* — Frank L. Kubler

(57) ABSTRACT

A waterless toilet is provided including a toilet bowl having bowl rim and mounted on top of a feed mechanism which in turn is mounted on top of a collection chamber. The feed mechanism progressively draws a flexible tubular liner from a roll, over the bowl rim and downwardly through the bowl so that it lines the bowl, through the feed mechanism and delivers the liner and any waste the liner contains into a waste collection chamber when the toilet is flushed.

20 Claims, 19 Drawing Sheets

(56) References Cited

U.S. PATENT DOCUMENTS

2019/0142231 A1\* 5/2019 Nelson ................ A47K 11/026
 4/483
2021/0101106 A1\* 4/2021 Clement ................ E03D 9/052

\* cited by examiner

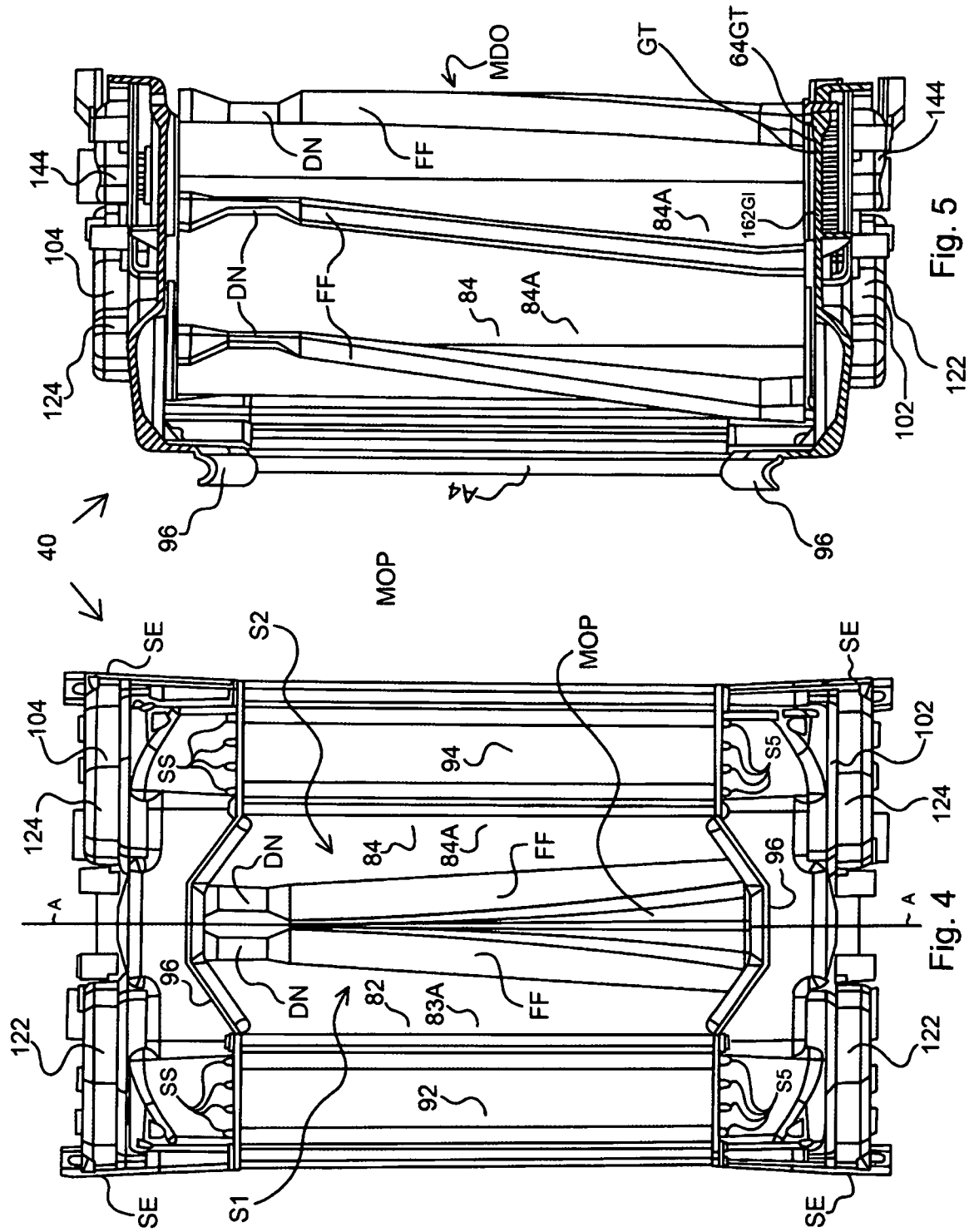

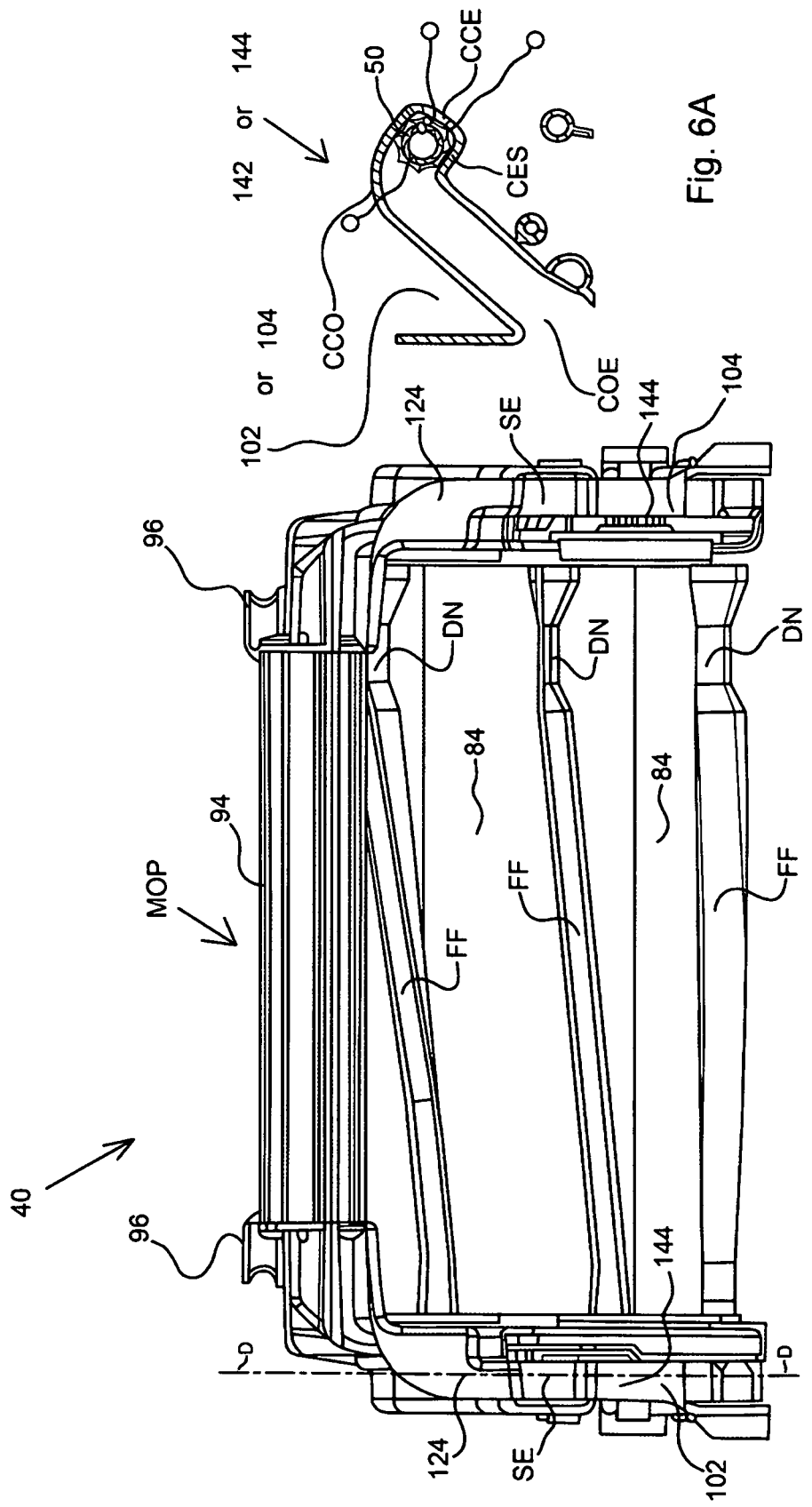

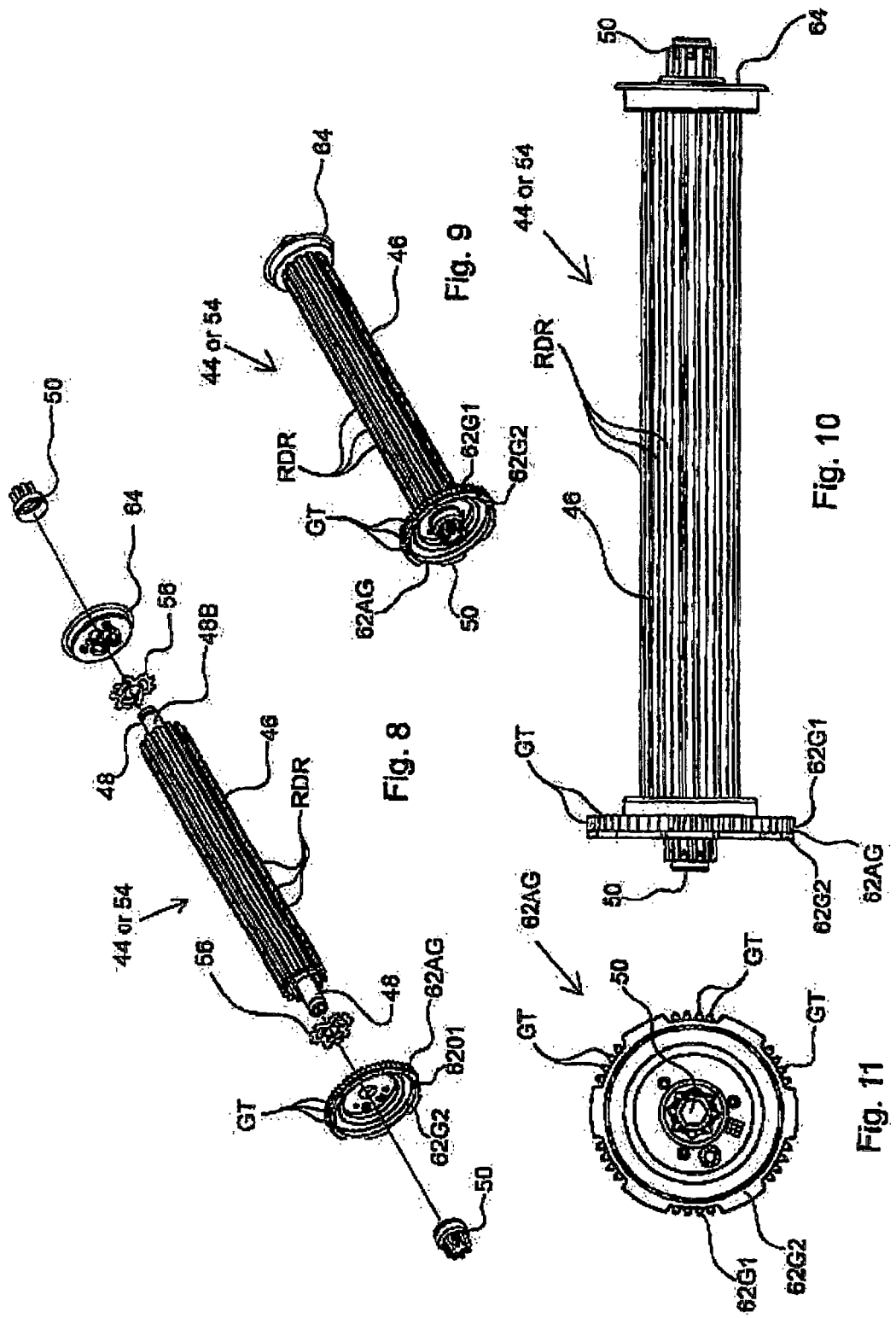

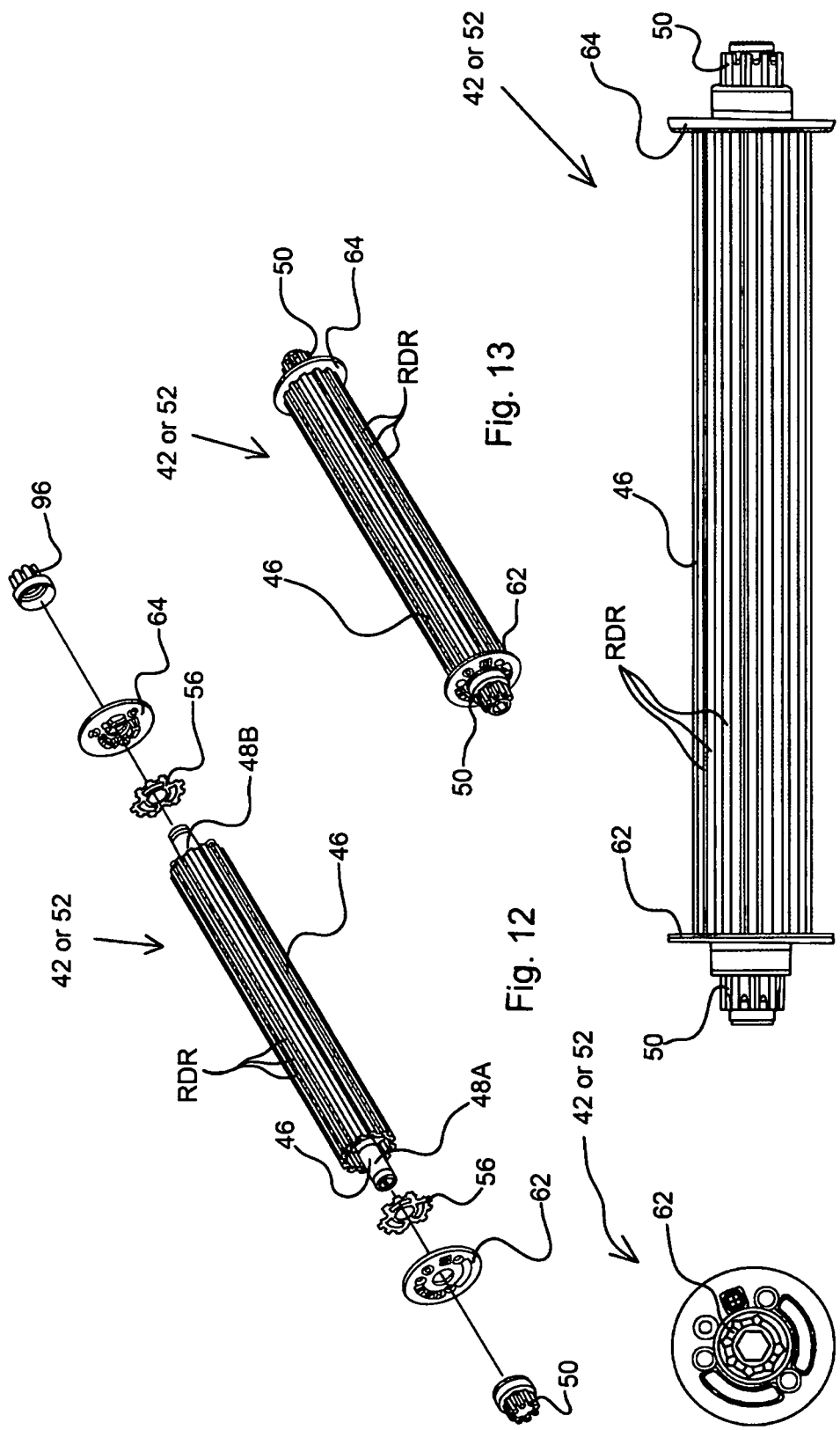

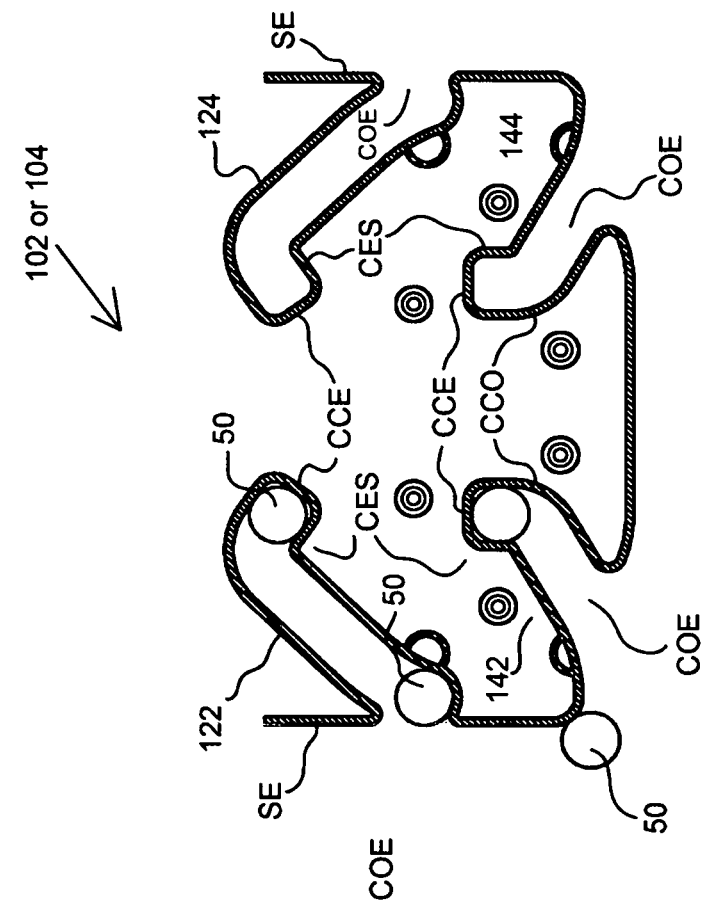
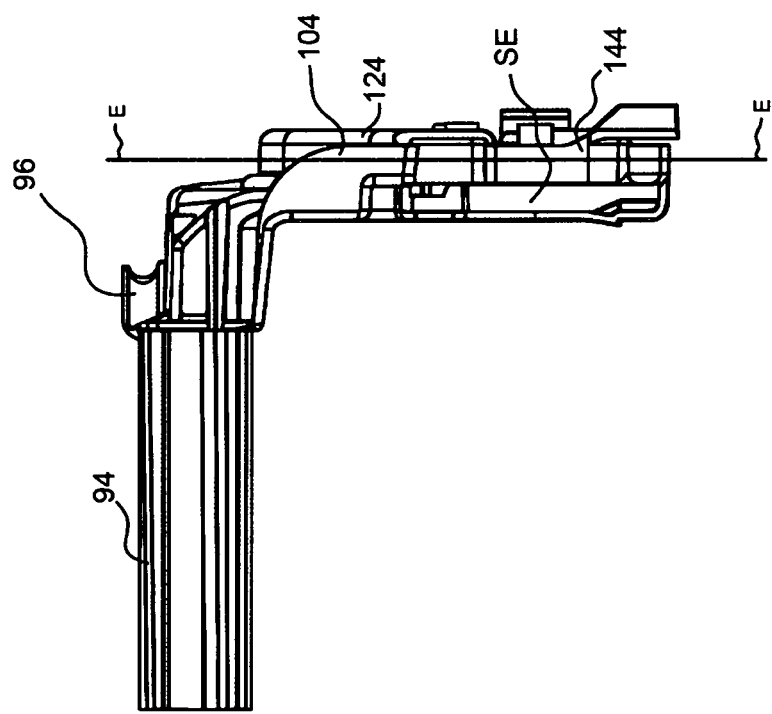
Fig. 19
Fig. 18

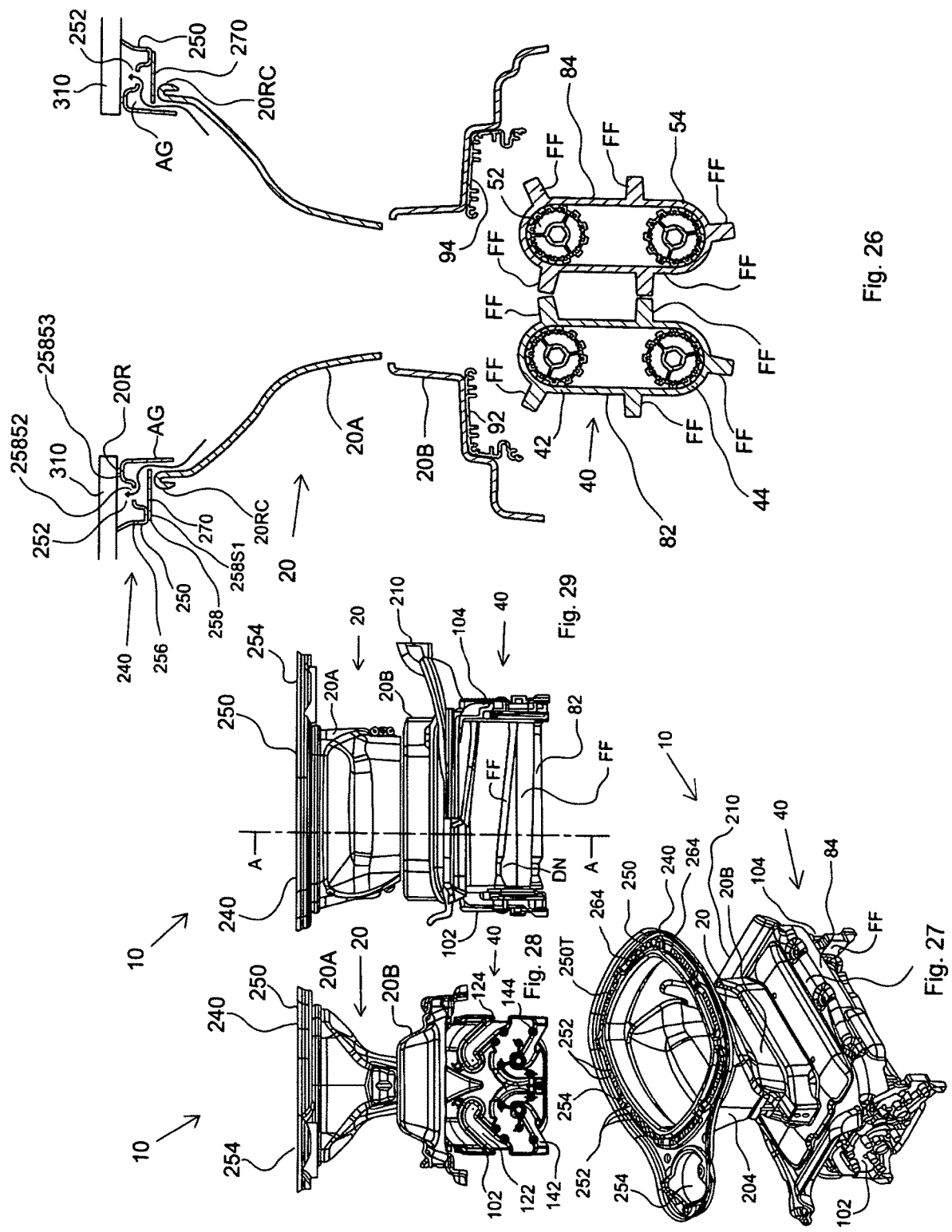

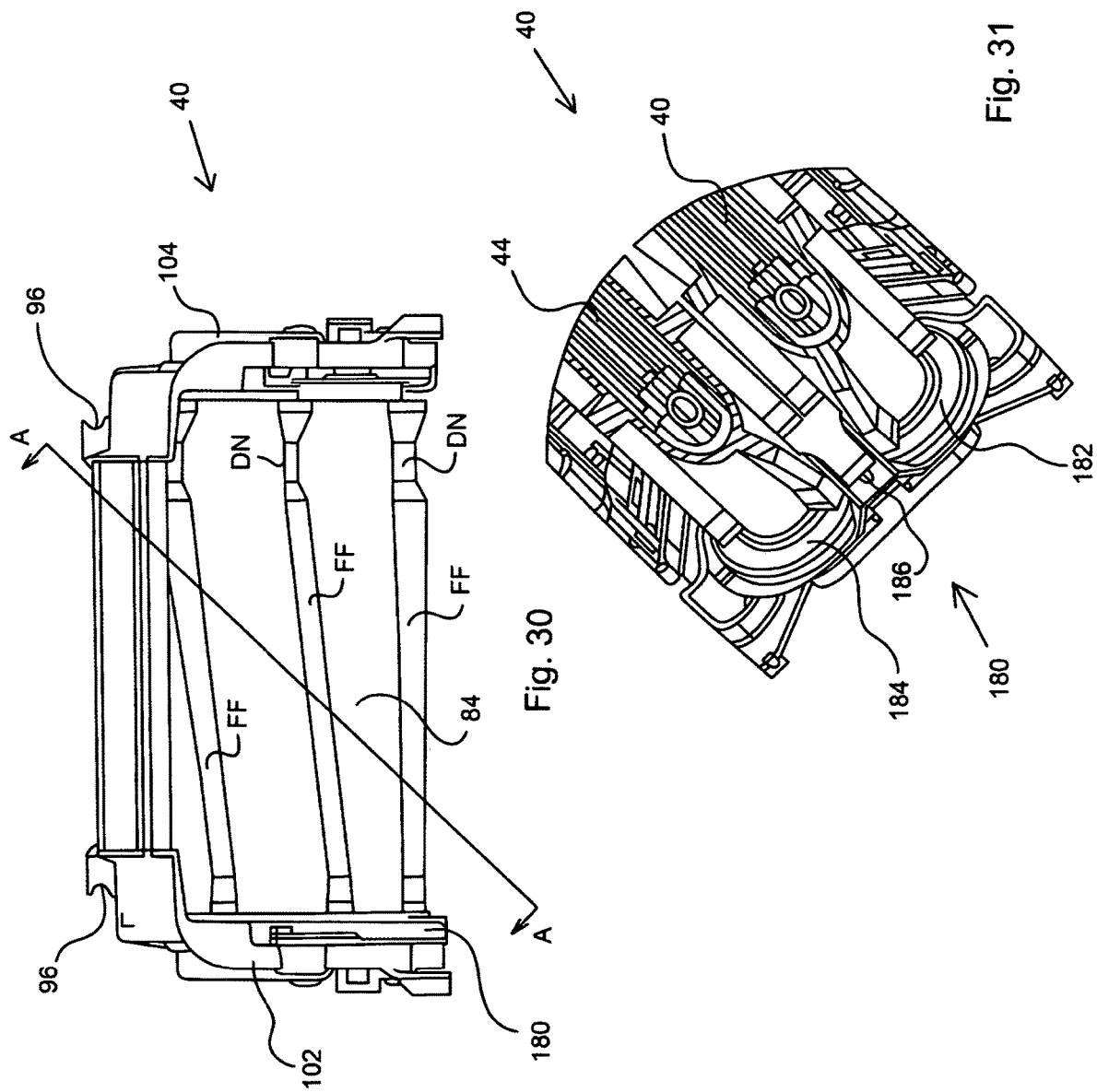

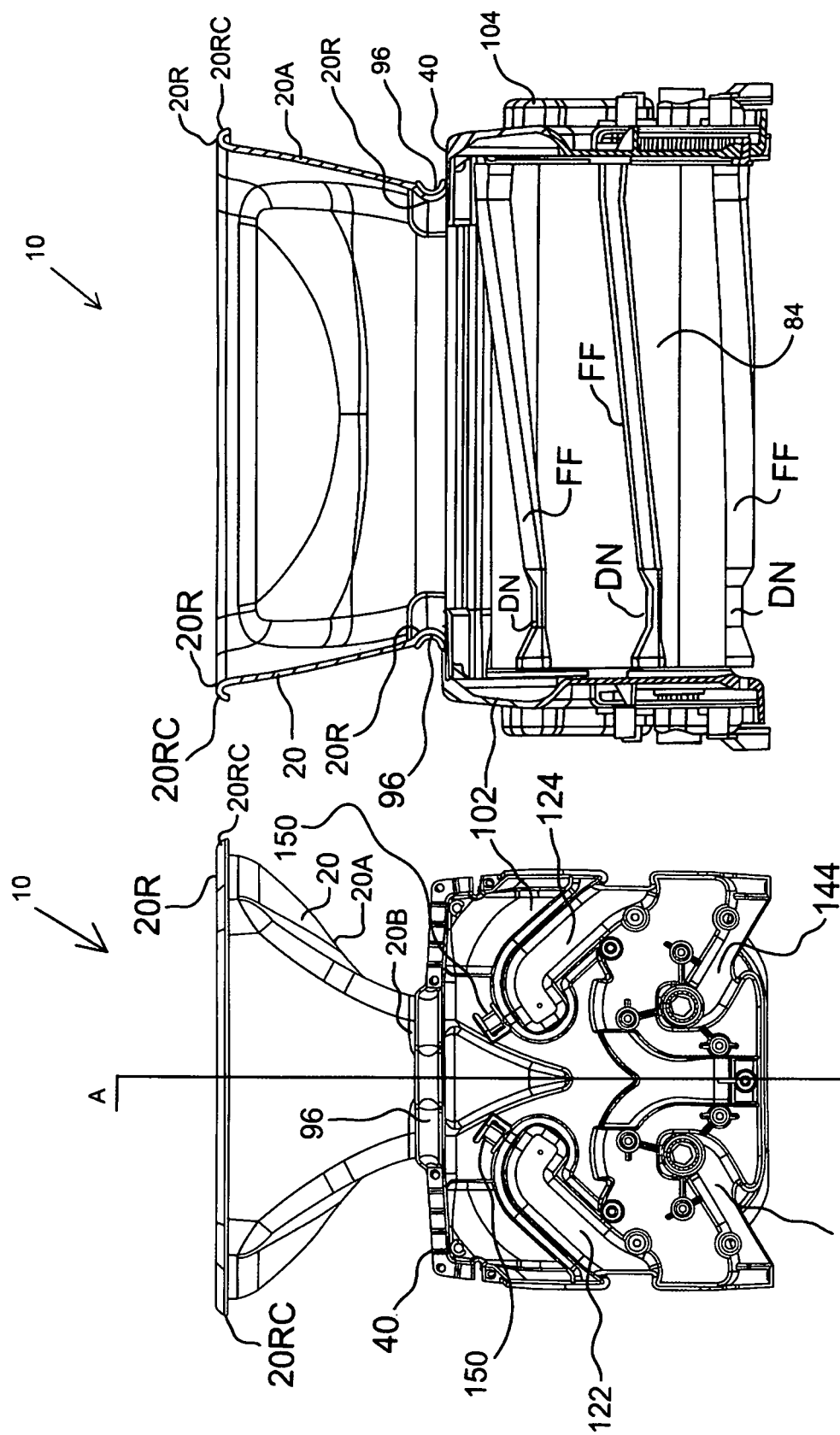

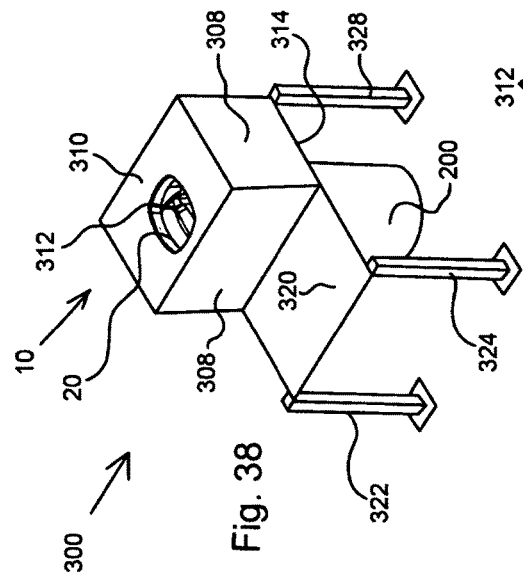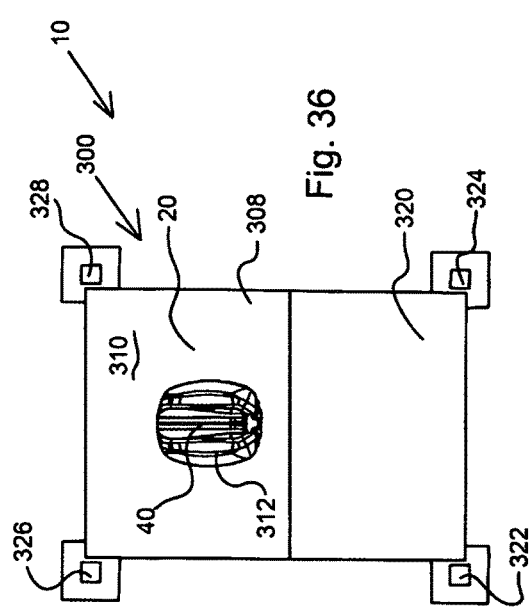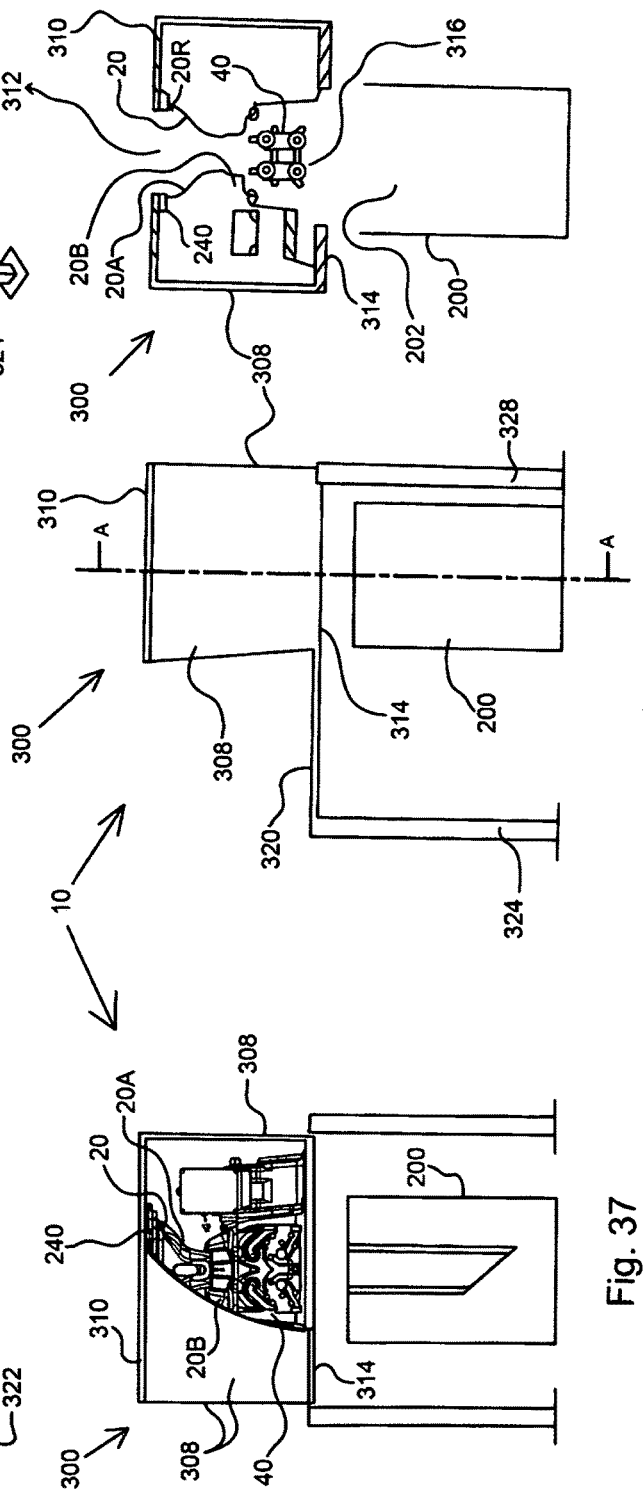

WATERLESS TOILET

BACKGROUND OF THE INVENTION

1. Field of the Invention

The present invention relates generally to the field of toilets. More specifically the present invention relates to a waterless toilet including a toilet bowl having bowl rim and mounted on top of a feed mechanism which in turn is mounted on top of a collection chamber. The feed mechanism progressively draws a flexible tubular liner from a roll, over the bowl rim and downwardly through the bowl so that it lines the bowl, through the feed mechanism and delivers the liner and any waste the liner contains into a waste collection chamber when the toilet is flushed.

The feed mechanism includes laterally spaced apart first and second roller sets. Each roller set includes an upper roller and a lower roller extending directly below and parallel to the upper roller, the upper and lower rollers extending substantially horizontally and being rotatably mounted on respective roller axles extending between and having axle ends removably retained in channels recessed into upright first and second end plates. A first feed belt extends around the first roller set and a second feed belt extends around the second roller set. Each feed belt, which preferably is formed of hard rubber or a similar material, has a belt outward surface with outwardly projecting and generally longitudinal feed fins which sequentially abut corresponding feed fins on the opposing belt and engage and draw the flexible tubular liner and any solid waste it contains through the feed mechanism as the rollers and belts are rotated by a drive motor or mechanical actuation.

The feed fins are angled relative to the rotational axes of their corresponding rollers about which the belts rotate, to guide waste liquid, a term as used in this herein which includes but is not limited to urine, to flow down the feed fins to a belt drain end, adjacent to which each fin has a drain notch through which waste liquid flows from the feed mechanism and into the waste collection chamber.

An inventive toilet valve structure is provided for blocking the passage of odors from the collection chamber into and through the bowl. The valve structure is formed by a combination of the drain notches at the ends of the feed fins and a thin, flexible, plastic tubular liner. When waste liquid coats the inner surfaces of the tubular liner, the liquid surface tension causes opposing regions of the tubular liner to releasably cling to each other, closing the notch, and forming barrier to the passage of air and odors. Then, when waste liquid is delivered into the bowl, it flows over the tubular liner inner surfaces and down the areas of the liner along the feed fins abutting the tubular liner to the location of the drain notches, and the weight of the liquid causes the clinging areas of the tubular liner to separate and thereby open the toilet valve to the flow until the flow stops. Then the surface tension causes the opposing areas of the tube liner to again cling to each other, thereby closing the valve.

The end plates preferably are structurally interconnected at their upper ends by two horizontal and generally parallel struts extending between the end plates, the struts being spaced apart to define between them a feed mechanism receiving opening through which the flexible tubular liner and the waste it contains passes. The struts preferably are secured at each end to the first and second end plates with self-tapping screws which pass through screw ports in the end plates into bores opposing ends of the struts.

Each end plate has two recessed upper roller axle channels and two opposing recessed lower roller axle channels (also hereinafter "channels"). Each roller axle channel extends from a channel open end at a plate side edge inwardly and upwardly to a downward bend in the channel forming a channel corner and a channel end segment around the channel corner, and terminates in a channel closed end. The end structure of a corresponding roller axle, referred to as an axle crown, fits closely into a corresponding axle channel open end and is slidable along the channel, around the channel corner and into the channel end segment, which securely but removably retains the axle crown, and finally abuts the channel closed end. The sides of the channel are spaced relative to the width of flat faces of the crown to engage and constrain the axle crown and thus the roller axle against rotation relative to the end plates. The channel closed ends for each roller set are farther apart than the channel open ends, so that when the axle crowns of the axles of the upper and lower rollers of a given roller set are inserted into the corresponding upper and lower channels, the axles progressively move apart from each other as the axle crowns are advanced along their respective channels and around the channel corners into the respective channel end segments. This progressive separation gradually tightens the given feed belt around its respective roller set until the belt is fully taut. When belt or roller maintenance or replacement are needed, the axle crowns of respective roller sets are simply advanced back along the channels.

An axle crown centering mechanism preferably is provided adjacent to each channel end segment to adjust the position of the axle crown and thus of the axle protruding end relative to the channel end segment in which it is retained to center the roller axles. A sensor may be provided to initiate each flush. An "anti-muncher" is provided which prevents the flexible tubular liner from becoming caught in teeth on roller gear caps at the ends of the rollers and the resultant tearing of the liner as it feeds.

2. Description of the Prior Art

There have long been waterless toilets for use where public water lines are not available. An example of such a prior toilet is described in U.S. Pat. No. 9,149,163, issued on Oct. 6, 2015 to assignee Loowatt, LTD, and assigned to the present applicant. While offering many advantages, this prior toilet can be somewhat time consuming to assemble and disassemble.

It is an object of the present invention to provide a waterless toilet which progressively delivers a bowl tubular liner downwardly through the toilet bowl and between opposing belts rotating on roller sets of a feed mechanism below the bowl, and then into a waste collection chamber below the belts.

It is another object of the present invention to provide such a toilet in which the feed mechanism can be quickly and easily disassembled and reassembled so that the belts can be removed and replaced, and any other service and maintenance performed.

It is a further object of the present invention to provide such a toilet including roller axles and feed mechanism end plates with roller mounting channels in which the ends of roller axles ride in the channels during roller mounting and removal, and in which the channels for each set of upper and lower rollers diverge from each other in the direction of roller mounting, so that the belt around the set of rollers gradually pulls taut as the roller axles ride in the channels during roller mounting.

It is still another object of the present invention to provide such a toilet which has an inventive odor valve including sections of the tubular liner which releasably cling to each other across an opening to create a seal that substantially or fully blocks the escape of odors from a waste collection chamber to which the toilet is connected from escaping through the toilet and out from the toilet bowl.

It is a yet further object of the present invention to provide such a toilet which includes gear covers or shields to assure that the tubular liner does not become caught in and deposit film on roller end cap drive gears, which the present invention provides in the form of what is referred to as an anti-muncher.

It is yet another object of the present invention to provide such a toilet which includes a venting mechanism which evacuates air from the bowl to reduce or eliminate odors.

It is finally an object of the present invention to provide such a toilet which is relatively simple in design, reliable and relatively inexpensive to manufacture and maintain.

SUMMARY OF THE INVENTION

The present invention accomplishes the above-stated objectives, as well as others, as may be determined by a fair reading and interpretation of the entire specification.

A waterless toilet is provided including a toilet bowl having bowl rim and mounted on top of a feed mechanism which in turn is mounted on top of a collection chamber. The feed mechanism progressively draws a flexible tubular liner from a roll, over the bowl rim and downwardly through the bowl so that it lines the bowl, through the feed mechanism and delivers the liner and any waste the liner contains into a waste collection chamber when the toilet is flushed. The feed mechanism includes laterally spaced apart first and second roller sets and feed belts with outwardly protruding feed fins mounted on the roller sets which rotate to advance waste from the bowl into the collection chamber.

BRIEF DESCRIPTION OF THE DRAWINGS

Various other objects, advantages, and features of the invention will become apparent to those skilled in the art from the following discussion taken in conjunction with the following drawings, in which:

FIG. 4 is a top plan view of the feed mechanism.

FIG. 5 is a cross-sectional side plan view of the feed mechanism.

FIG. 6 is a side plan view of the feed mechanism.

FIG. 6A is a partial cross-sectional side view of the first end plate along line D-D, showing an upper roller axle channel.

FIG. 8 is an exploded, perspective view of a lower roller.

FIG. 9 is an assembled view of the lower roller of FIG. 8.

FIG. 10 is a side plan view of the lower roller.

FIG. 11 is an end plan view of the lower roller.

FIG. 12 is an exploded, perspective view of an upper roller.

FIG. 13 is an assembled view of the upper roller of FIG. 12.

FIG. 14 is a side plan view of the upper roller.

FIG. 15 is an end plan view of the upper roller.

FIG. 18 is a side view of an end plate and of an end of the first or second strut connected to the end plate.

FIG. 19 is a cross-sectional view along line E-E of FIG. 18.

FIG. 26 is a cross-sectional along line A-A of FIG. 29 side view of the bowl, vented module and a schematic representation of the feed mechanism rollers and belts.

FIG. 27 is perspective view of the bowl with vented module secured to the feed mechanism.

FIG. 28 is an end view of the bowl, vented module and feed mechanism of FIG. 27.

FIG. 29 is a side view of the bowl, vented module and feed mechanism of FIGS. 27 and 28.

FIG. 30 is side view of the feed mechanism.

FIG. 31 is a cut-away view of the feed mechanism of FIG. 30 taken along line A-A.

FIG. 32 is an end view of the bowl mounted onto the feed mechanism.

FIG. 33 is a side view of the bowl mounted onto the feed mechanism of FIG. 32.

FIG. 36 is a top view of the toilet substantially as a whole and assembled.

FIG. 37 is a front view of the toilet of FIG. 36 with a portion of the housing side wall broken away to review and feed mechanism.

FIG. 38 is a perspective view of the toilet of FIG. 36.

FIG. 39 is a side view of the toilet of FIGS. 36 and 38.

FIG. 40 is a cross-sectional side view of the toilet of FIG. 36-39 including a schematic representation of the rollers and belts of the feed mechanism.

DETAILED DESCRIPTION OF THE PREFERRED EMBODIMENTS

Figure 1:
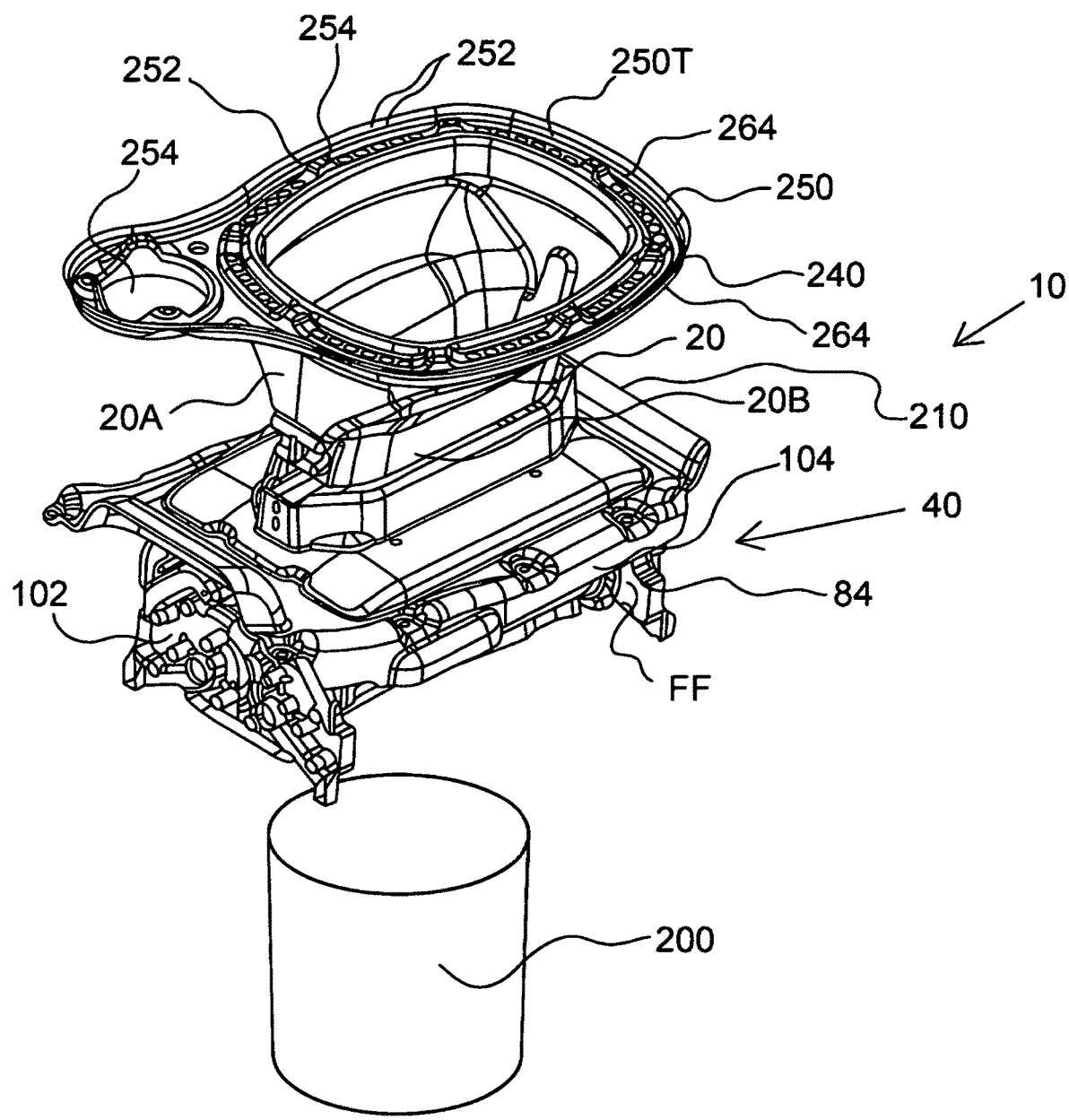
FIG. 1 is a perspective view of the complete waterless toilet according to the present invention, including a toilet bowl mounted on top of a feed mechanism in turn mounted on top of a collection chamber.
Figure 2:
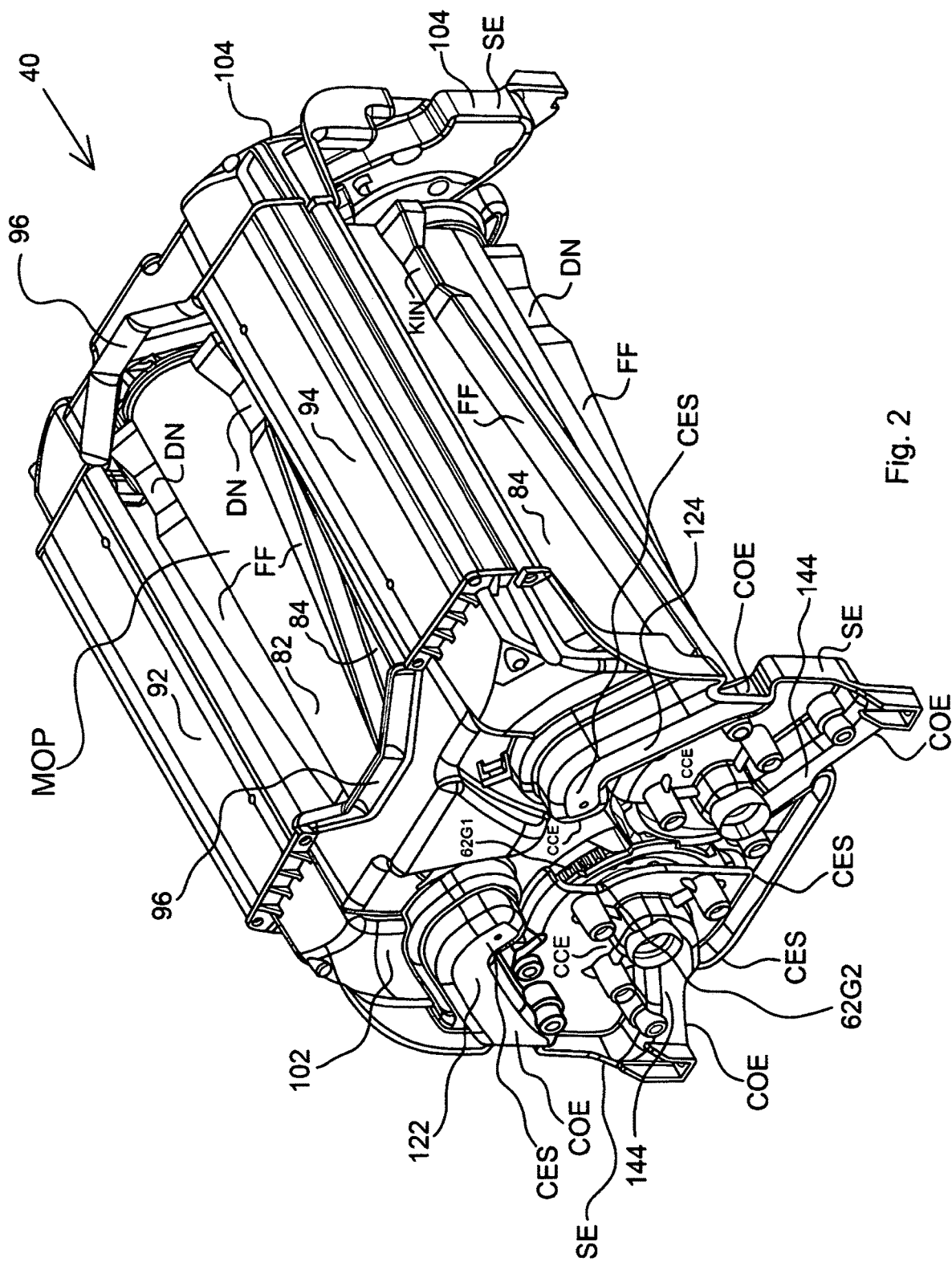
FIG. 2 is a perspective view of the inventive feed mechanism.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIGS. 1-40, a waterless toilet 10 is disclosed including a toilet bowl 20 having a bowl rim BR and a bowl upper opening BUO and a bowl lower opening BLO and mounted on top of a feed mechanism 40 having a feed mechanism receiving opening MOP and a feed mechanism dispensing opening MDO that progressively draws a flexible tubular liner 22 from a liner roll (not shown), over the bowl rim BR and downwardly through the bowl 20 so that it lines the bowl 20, through the feed mechanism 40 and delivers the liner 22 and any waste it contains into a chamber receiving opening CRO of a waste collection chamber 200 below the feed mechanism 40 when the toilet flushes. The feed mechanism 40 includes laterally spaced apart first and second roller sets S1 and S2. The first roller set S1 includes a first upper roller 42 and a first lower roller 44 extending directly below and parallel to the upper roller 42, and the second roller set S2 includes a second upper roller 52 and a second lower roller 54 extending once again directly below and parallel to the second upper roller 52. The upper and lower rollers 42 and 52, and 44 and 54 extend substantially horizontally and are rotatably mounted on respective roller axles 48 extending between and removably in channels recessed into mounted to rigid and upright first and second end plates 102 and 104. A first feed belt 82 extends around the first roller set S1 and a second feed belt 84 extends around the second roller set S2. Feed belts 82 and 84, which preferably are formed of a hard rubber or a similar material, have a belt outward surfaces 82A and 84A respectively with outwardly projecting and generally longitudinal belt feed fins FF which abut a corresponding feed fin FF on the opposing belt 84 and 82 to engage and draw the flexible tubular liner 22 and any solid waste within the liner 22 through the feed mechanism 40 as they are rotated by a drive motor 220. The motor 220 is connected to a toilet electric circuit (not shown) and the motor 220 is activated to flush the toilet 10 preferably by pushing a conveniently located button operated switch in the circuit. Pressing the button causes the motor 220 to rotate the rollers 42 and 52, and rotate thus rollers 42 and 52 and the drive belts 82 and 84 to advance waste through the feed mechanism 40. The motor 220 is drivably connected to one of the gear caps 62AG through a gear box 222 and a drive shaft 224 with a hex-shaped end. See FIGS. 21-25. The motor 220 and gear box 222 are contained within a motor housing 226, as is a power cord 220A extending from the motor 220 to a power cord connection 220B extending through the housing 226. The motor housing 226 fastens to a motor housing mounting plate 228, which fastens to an adaptor plate 228A, which is in turn is fastened to the adjacent end plate 102. Other, alternative, mechanical actuators including drive means are contemplated, such as a hand crank (not shown) drivably connected to rollers 44 and 54, and thereby to rollers 42 and 52, to operate feed mechanism 40.

The feed fins FF are angled relative to the rotational axes of the corresponding rollers 42, 44, 52 and 54 about which the belts 82 or 84 rotate, to guide waste liquid to flow down the feed fins FF to a drain end of the belts 82 and 84, adjacent to which each feed fin FF has a drain notch DN through which waste liquid drains from the feed mechanism and into the waste collection chamber 200.

An inventive toilet valve 30 is provided for blocking the passage of odors from the collection chamber 200 into and through the bowl 20. Valve 30 is formed by a combination of the drain notches DN at the ends of the feed fins FF and a thin, flexible, plastic tubular liner 22. When waste liquid coats the inner surfaces of the tubular liner 22, the liquid surface tension causes opposing regions of the tubular liner 22 to releasably cling to each other, closing the notch DN, and forming a barrier to the passage of air and odors. Then, when waste liquid is delivered into the bowl, it flows over the tubular liner 22 inner surfaces and down the areas of the liner 22 along the feed fins FF abutting the liner 22 to the location of the drain notches DN, and the weight of the liquid causes the clinging areas of the tubular liner 22 to separate and thereby open the toilet valve 30 to the flow until the flow stops. Then the surface tension causes the opposing areas of the tube liner 22 to again cling to each other, thereby closing valve 30.

Each belt 82 and 84 has a belt inward surface 82B and 84B, respectively, with longitudinal belt drive ribs BDR, and each roller 42, 44, 52 and 54 includes a roller cylinder 46 with a cylinder outward surface 46A from which roller drive ribs RDR protrude, which engage and mesh with corresponding belt drive ribs BDR.

The end plates 102 and 104 preferably are structurally interconnected at their upper ends by two horizontal and generally parallel first and second struts 92 and 94 extending between the end plates 102 and 104. The struts 92 and 94 are spaced apart to define between them a feed mechanism receiving opening OP through which the flexible tubular liner 22 and the waste it contains passes.

The first and second struts 92 and 94 preferably are secured at each end to the first and second end plates 102 and 104 with self-tapping strut screws (not shown) which pass through screw ports SP in the end plates 102 and 104 into spaces between extruded beads or screw bores (not shown) on opposing ends of the first and second struts 92 and 94. See FIGS. 7 and 16. The first and second struts 92 and 94 preferably are formed of aluminum, and end plates 102 and 104 preferably are formed of a suitable, durable plastic.

The toilet bowl 20 preferably has a funnel-shaped bowl upper portion 20A and a separate, annular lower bowl portion 20B aligned and registering with the upper bowl portion 20A. See FIG. 26, Alternatively, the bowl 20 is provided a single piece. The lower portion of the bowl 20 or bowl lower portion 20B preferably has an inwardly protruding bowl mounting rib 20R which releasably snaps into a universal, circumferential bowl mounting channel member 96 which is clipped or otherwise affixed to the upper surfaces of the first and second end plates 102 and 104 and extending around a central portion of the waste passing space between the struts 92 and 94. See FIGS. 22-33.

Each roller 42, 44, 52 and 54 preferably includes disk-shaped first and second retainer caps 62 and 64 secured, respectively, to first and second cylinder ends 46A and 46B, protruding radially outward beyond the roller cylinder 46 to retain the feed belt 82 or 84 against advancement off the roller 42, 44, 52 and 54 ends and into contact with an end plate 102 or 104. An annular fin seal 56 is provided between each retaining cap and the adjacent cylinder to rotatably anchor the cap relative to the cylinder. As noted, the first retainer cap of each lower roller 44 is a gear cap 62AG having gear teeth GT extending radially outward for engaging the gear cap 62AG of the adjacent lower roller 44 or 54 and engaging a drive gear (not shown) propelled by the drive motor 220. Each roller cylinder 46 contains a longitudinal axle passageway 46P through which its roller axle 48 is rotatably fitted, so that the roller 42, 44, 52 or 54 is rotatable about its roller axle 48, and the roller axle 48 has axle protruding ends 48A and 48B which protrude outwardly beyond the cylinder ends 46A and 46B beyond the retainer cap 62 and 64, or 62AG and 64. The axle protruding ends 48A and 48B each terminate in a multi-sided engagement structure referred to herein as an axle crown 50, configured as a polygon with parallel opposing pairs of polygon faces.

To help insure that opposing feed fins FF of the first and second feed belts 82 an 84 always directly meet each other, each gear cap 62AG preferably includes a double gear assembly. This double gear assembly includes a first cap gear 62G1 having smaller gear teeth GT and a second cap gear 62G2 having long, flat gear teeth GT1 and being laterally adjacent to and preferably formed as a single piece with the first gear cap 62AG. The first cap gear 62G1 and the second cap gear 62G2 of one gear cap 62AG simultaneously mesh respectively with the first cap gear 62G1 and the second cap gear 62G2 of the adjacent gear cap 62AG.

The electric drive motor 220 or other drive source, causes a drivably engaged lower roller 44 or 54 to rotate, which in turn rotates the opposing lower roller 54 or 44 and feed belts 82 or 84 thereby rotating the upper rollers 42 and 52. The roller sets S1 and S2 rotate in opposite directions, so that the segments of the feed belts 82 and 84 passing between the roller sets S1 and S2 both advance downwardly at the same speed to draw the flexible tubular liner 22 through the feed mechanism 40.

Each end plate 102 and 104 has two upper roller axle channels 122 and 124 and two opposing lower roller axle channels 142 and 144 (also hereinafter "channels") recessed into the given end plate 102 or 104. Each roller axle channel 122, 124, 14-2 and 144 extends from a channel open end COE at a plate side edge SE inwardly and upwardly to a downward bend in the channel 122, 124, 142 and 144 forming a channel corner CCO and a channel end segment CES around the channel corner CCO, terminating in a channel closed end CCE. See FIGS. 6A-19. The axle crown 50 of a corresponding roller axle 48 fits closely into a corresponding axle channel open end COE and is slidable along the channel 122, 124, 142 and 144, around the channel corner CCO and into the channel end segment CES, which securely but removably retains the axle crown 50, and finally abuts the channel closed end CCE. The sides of the channel are spaced relative to the width of flat faces of the crown 50 to engage and constrain the axle crown 50 and thus the roller axle 48 against rotation relative to the end plates 102 and 104. The closed ends CCE of the channels 122, 124, 142 and 144 for each roller set S1 and S2 are farther apart than the corresponding channel open ends COE, so that when the crowns 50 of the axles 48 of the upper and lower rollers 42 and 52, and 44 and 54 of a given roller set S1 or S2 are inserted into the corresponding upper and lower channels 122 and 124, and 142 and 144, the axles 48 progressively move apart from each other as the axle crowns 50 are manually advanced along their respective channels 122 and 142, and 124 and 144 and around the channel corners CCO into the respective channel end segments CES. This progressive separation gradually tightens the given feed belt 82 or 84 around its respective roller set S1 or S2 until the belt 82 or 84 is fully taut. When belt 82 or 84 or roller 42, 44, 52 or 54 maintenance or replacement are needed, the axle crowns 50 of respective roller sets S1 and S2 are simply advanced back along the channels 122, 124, 142 and 144.

A roller centering mechanism 150 preferably is provided at each end of each roller 44, 46, 52 and 54, which centers the given roller between end plates 102 and 104, while the axle crown 50 rides within its channels 122, 124, 142 or 144. See FIGS. 16 and 20. Roller centering mechanism 150 includes a spring member in the form of a resilient tab 152 cut ot of the given end plate 102 or 104 on three sides. A resilient tab 152 bows inwardly against an adjacent roller retainer cap 62, but a resilient tab 152 is not provided for either of gear caps 62AG, which are locked at one end. The resilience of the opposing tabs 152 keeps each roller 44, 46, 52 and 54 centered between end plates 102 and 104.

Figure 3:
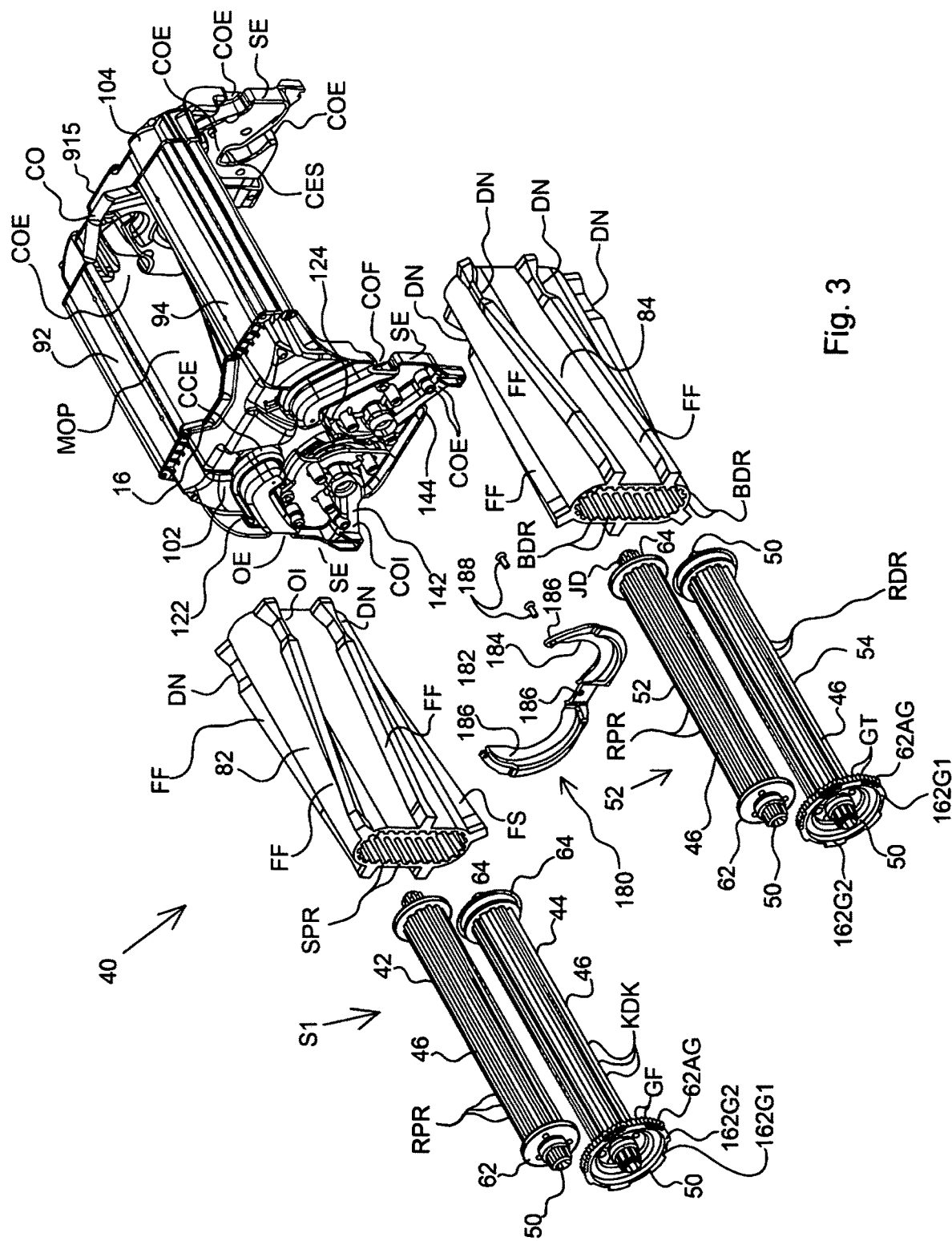
FIG. 3 is an exploded, perspective view of the feed mechanism of FIG. 2.
Figure 7:
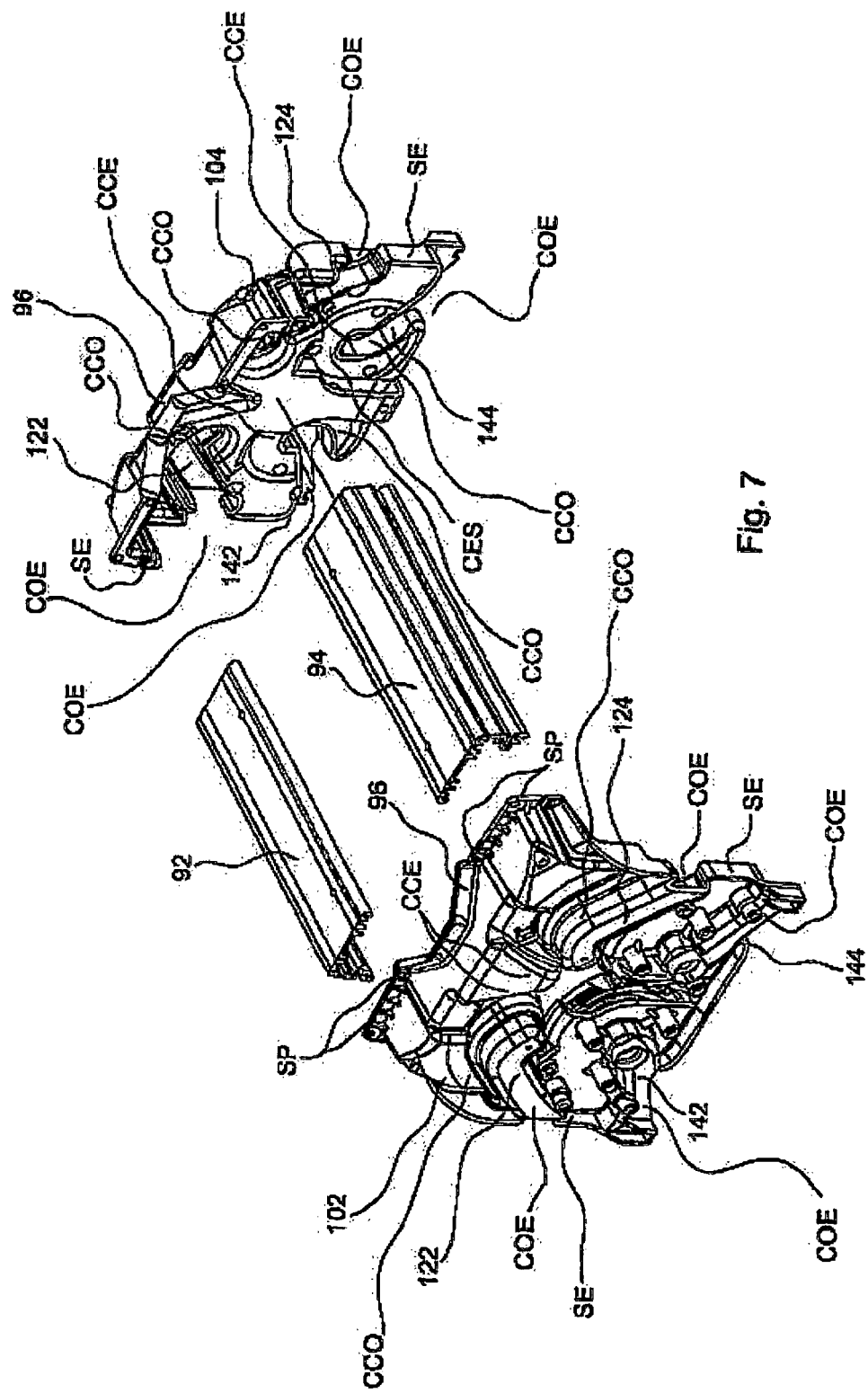
FIG. 7 is an exploded, perspective view of the feed mechanism.
Figure 17:
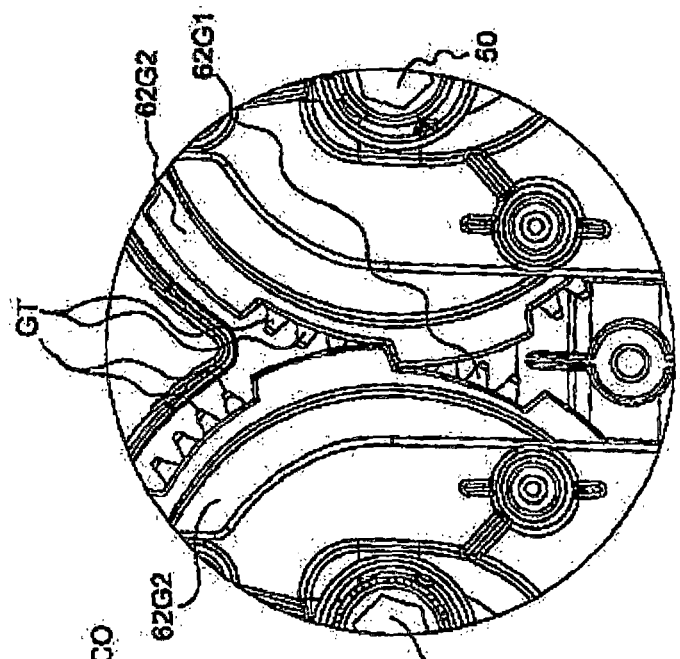
FIG. 17 is a partial, close-up end view of the meshing gear cap of the lower rollers of FIG. 16.
Figure 20:
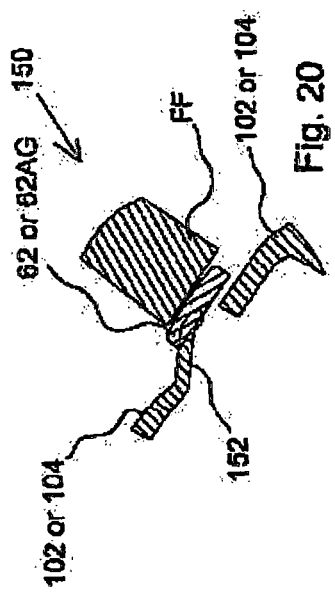
FIG. 20 is a side, cross-sectional view of one of the axle crown centering mechanisms.
Figure 16:
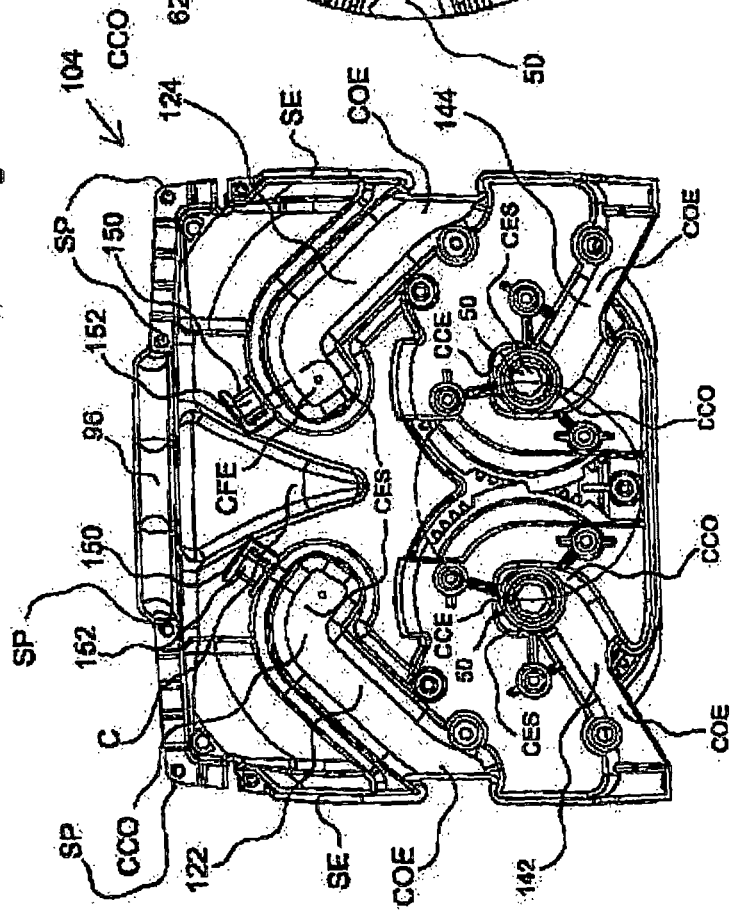
FIG. 16 is an end plan view of the feed mechanism.
Figure 21:
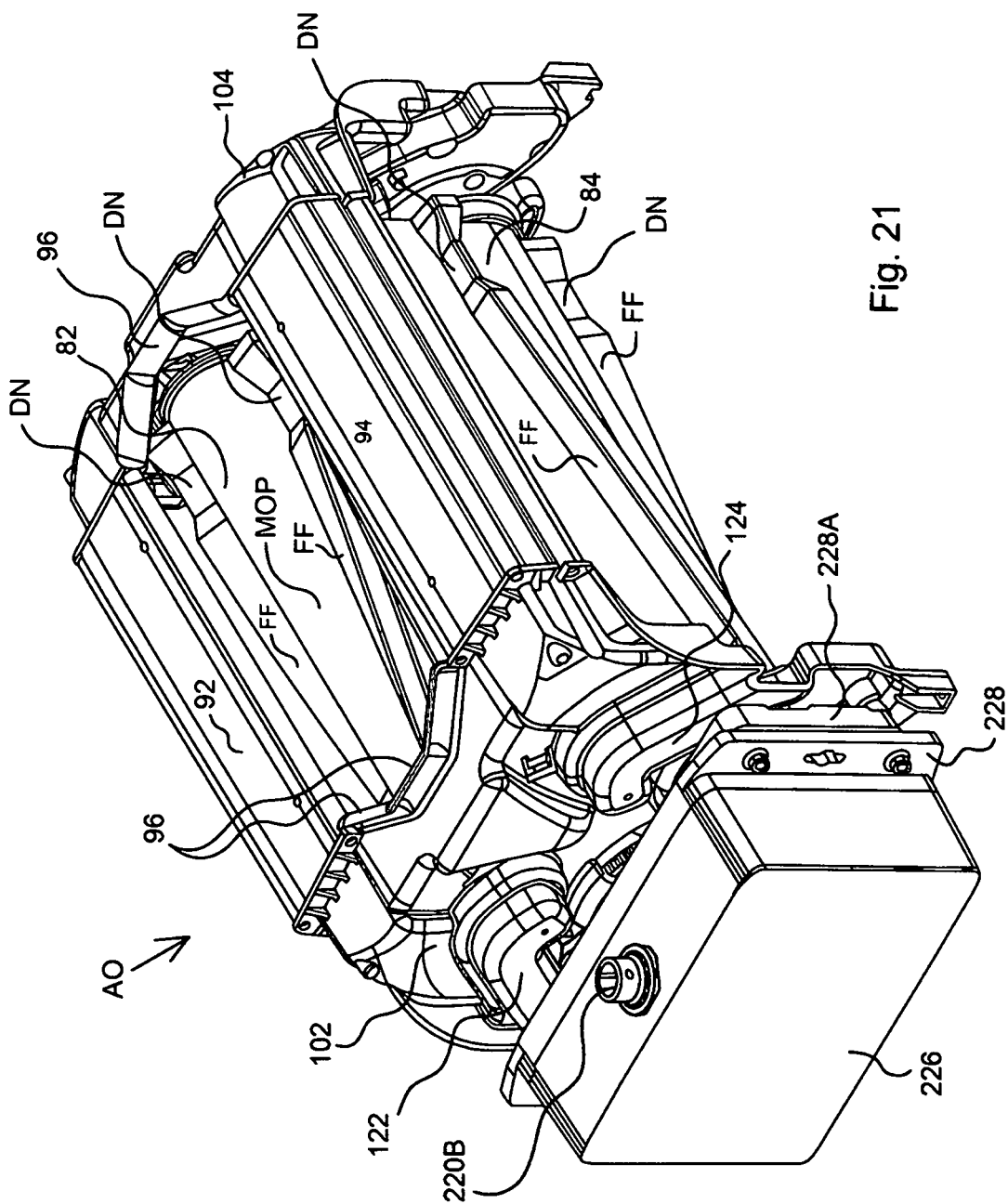
FIG. 21 is a perspective view of the feed mechanism with the motor housing a motor attached so that the motor can drive the cap gears and thus the rollers and belts.
Figure 22:
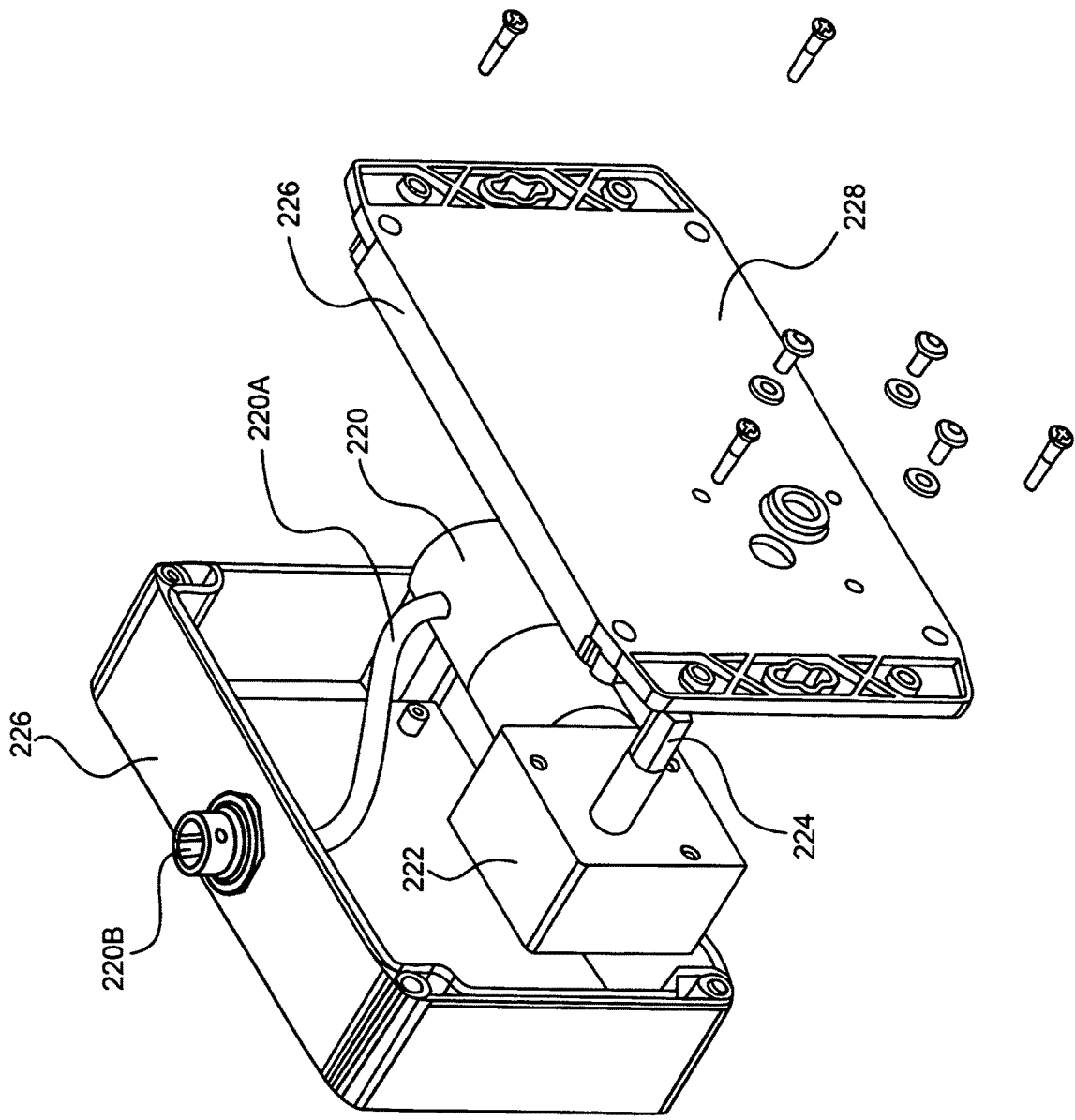
FIG. 22 is an exploded, perspective view of the motor housing and contained motor, with the motor housing back wall separated to reveal the motor.
Figure 23:
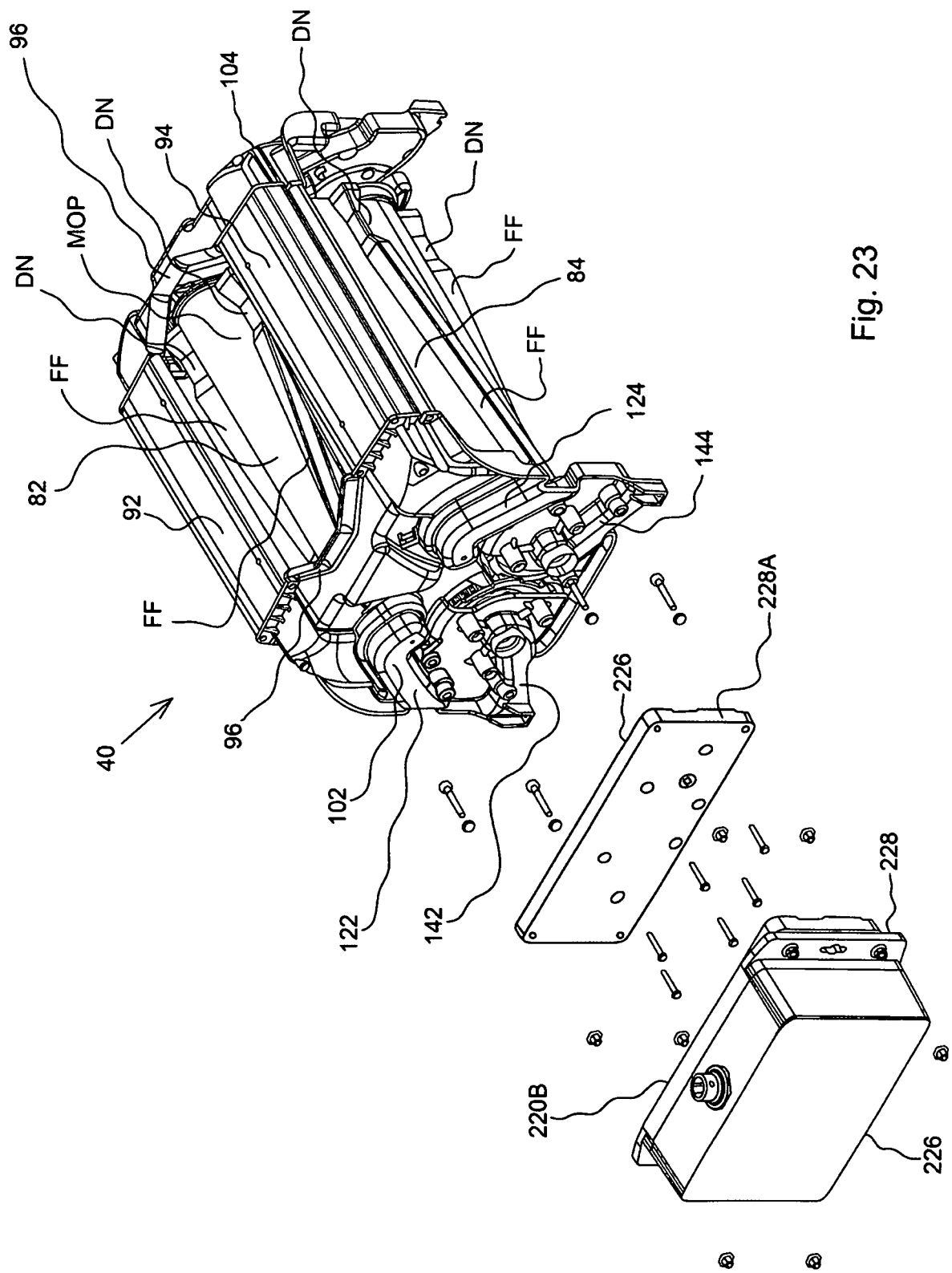
FIG. 23 is a perspective view of the motor housing, motor housing back wall and feed mechanism in exploded relation.
Figure 24:
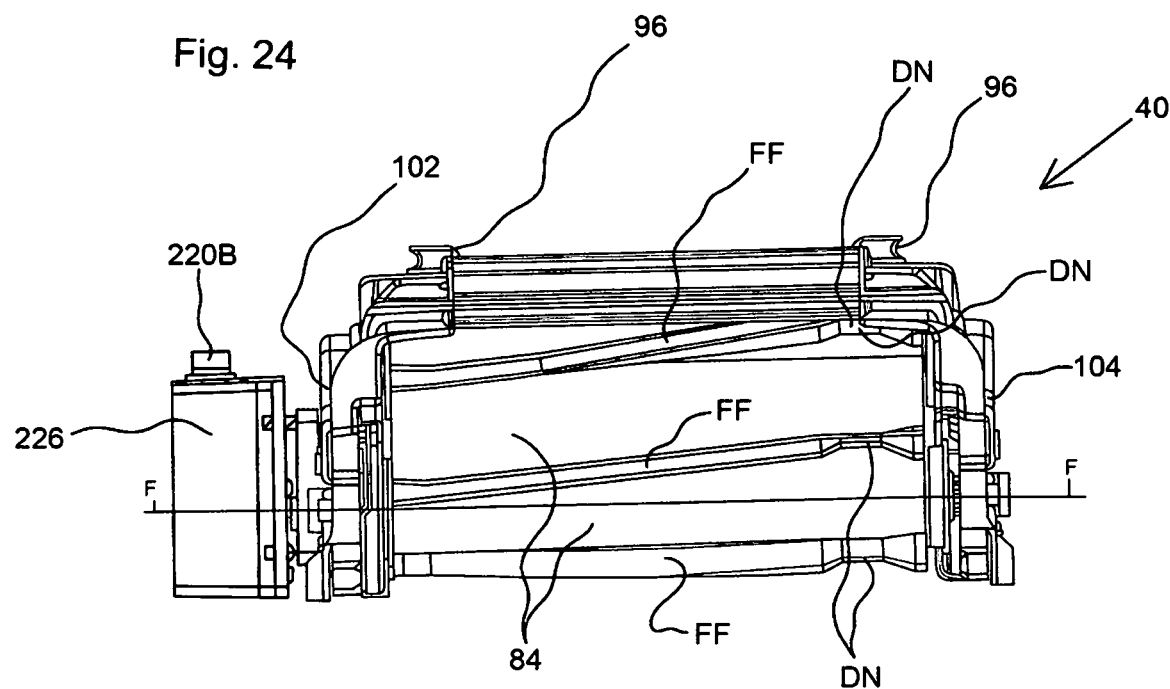
FIG. 24 is a side view of the feed mechanism and attached motor housing.
Figure 25:
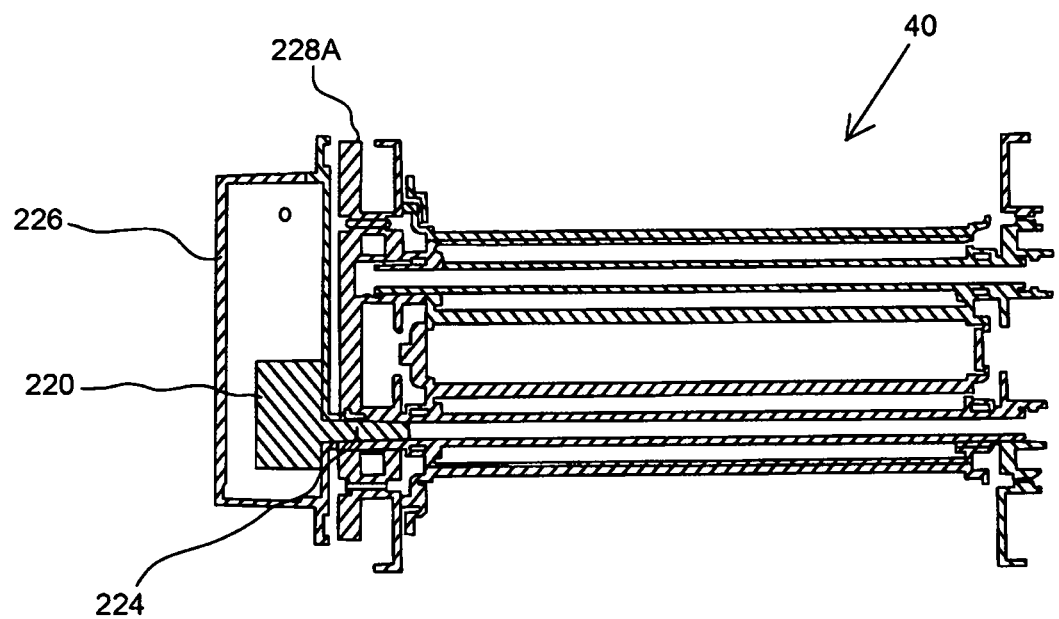
FIG. 25 is a cross-sectional top view of the feed mechanism and attached motor housing, motor and motor drive shaft.
Figure 34:
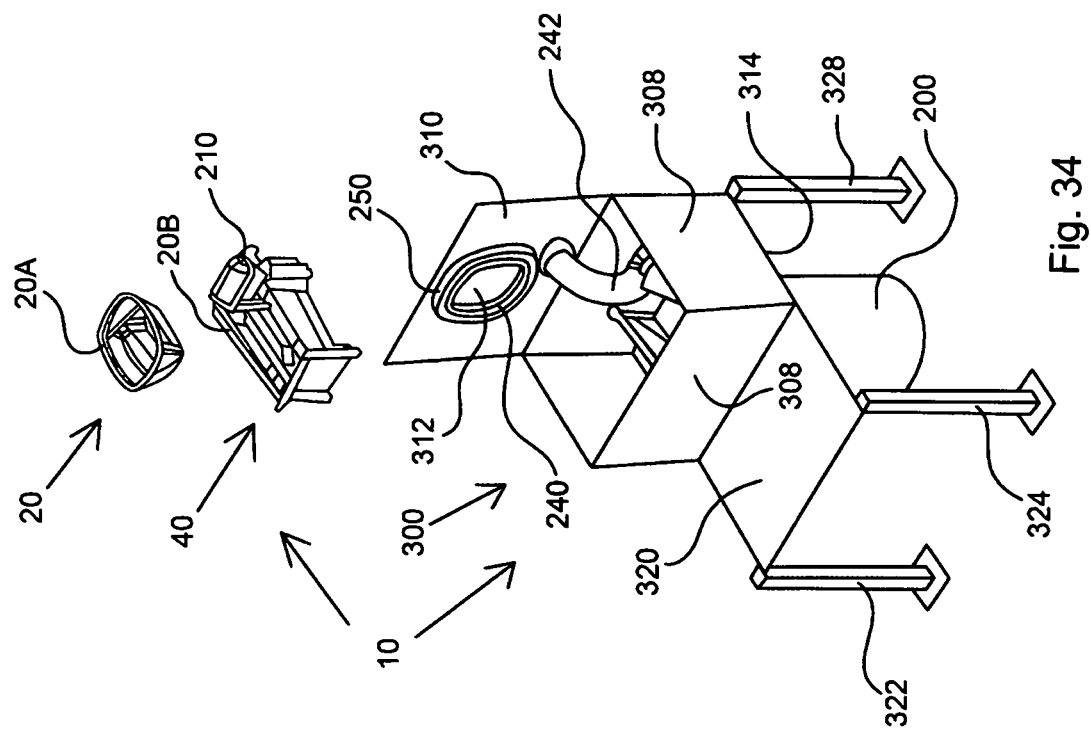
FIG. 34 is an exploded perspective view of the toilet substantially as a whole, showing the bowl, feed mechanism, toilet housing with the housing top wall open and collection chamber.
Figure 35:
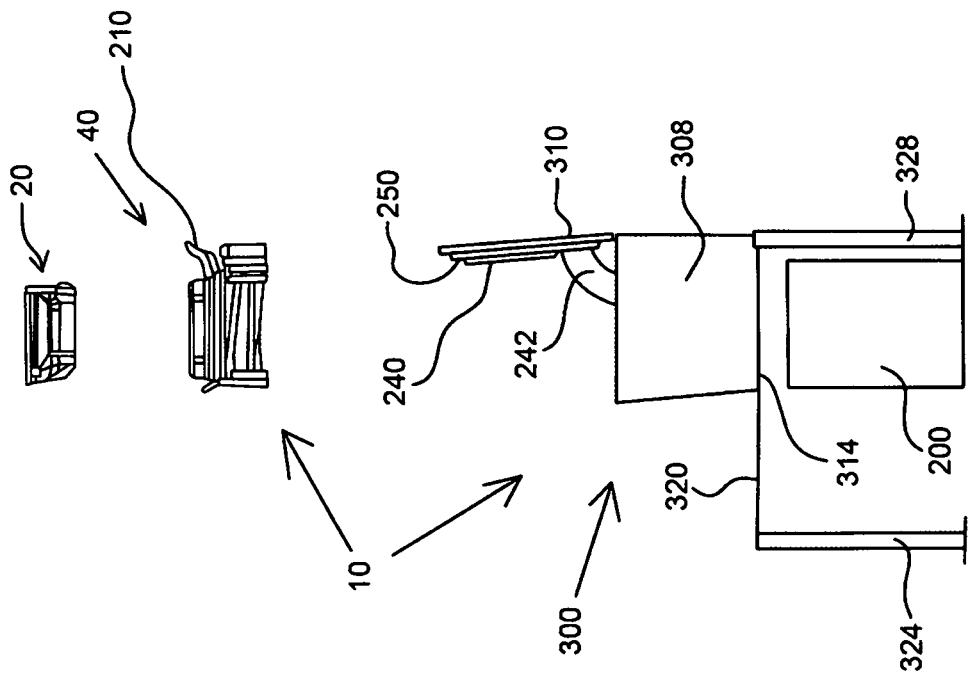
FIG. 35 is an exploded side view of the toilet of FIG. 34.

An anti-muncher 180 is provided in the form of a gear cover, as illustrated in FIG. 3, which is secured to the outward surface of the first end plate 102. Anti-muncher 180 prevents the tubular liner 22 from becoming caught between meshing gear teeth GT on gear caps 62AG as it advances downwardly between belts 82 and 84, and thus prevents tearing of the flexible tubular liner 22 as it feeds. Each anti-muncher 180 includes first and second arched gear shield segments 182 and 184 having L-shaped cross-sections to fit around and cover the sides and peaks of the gear teeth GT, and are interconnected by an interconnection link portion 86. Anchor screws 188 pass through anchor screw holes 186 at the ends and in the center of the anti-muncher 180 and into the adjacent first end plate 102.

The feed mechanism 40 is enclosed by a generally box-shaped toilet housing 300 fitted over. See FIG. 1. The toilet housing 300 includes housing side wall 308 and a generally horizontal housing top panel which will be referred to as a seat bench 310. The seat bench has a seat bench opening 312 through which liquid and solid waste pass into the toilet bowl 20. See FIGS. 34-40. The toilet housing 300 further includes a housing bottom wall 314 which has a central waste passing bottom wall opening 316 and protrudes forwardly from the housing side wall 308 to define a foot panel 320. The toilet housing 300 is elevated on four housing legs 322, 324, 326 and 328 so that the collection chamber 200 can be slid and pass closely underneath the housing 300 until the seat bench opening 312 registers with the collection chamber opening 202. As a result, the collection chamber 200 can be readily removed and emptied when full.

A wire shroud 210 optionally extends upwardly from the housing top wall behind the toilet bowl 20. Wire shroud 210 covers wires extending from the toilet 10, such as a wire extending from the electric motor 220 to a power source (not shown), both to prevent damage to the wires and for aesthetic purposes. See FIGS. 27 and 29.

An optional but preferred feature of toilet 10 is a vented module 240 which is secured above to the underside of the seat bench 310. Vented module 20 extracts odors from inside the bowl 20 and delivers them into a discharge duct 242 which carries the odors away from the toilet 10, preferably about two meters away. See FIGS. 26 and 29. The vented module 240 can be provided either as an accessory which is retro-fitted to the toilet 10, or can be manufactured as part of toilet 10.

The preferred embodiment of the vented module 240 includes a looped channel 250 sized and shaped to follow the rim 20R of the toilet bowl 20 and has at least one air admission opening 252. The rim 20R preferably includes a rim cuff 20RC which curves back around the bowl 20 to provide a smooth upper surface over which the tubular liner 22 can ride, as it feeds into the bowl 20. Looped channel 250 has a laterally expanded channel segment forming a fan or blower mounting region 254 with a blower mounting port 256, into which a blower 280 is mounted to evacuate air and odors from the bowl 20 through the looped channel 250 into a discharge duct 242. See FIGS. 27, 34 and 35. The vented module 240 is secured to the underside of the toilet seat bench 310 so that it encircles the seat bench opening 312 and the height of the seat bench 310 relative to the height of the bowl rim 20R spaces the vented module 240 a small distance above the rim 20R, such as an eighth of an inch. The looped channel 250 has an open channel top 250T which is covered by the seat bench 310 to become a looped passageway.

The preferred looped channel 250 has a cross-section as shown in FIG. 26, including a channel outer side wall 256, a channel bottom wall 258 with an outer, bottom wall lower step portion 258S1 and a bottom wall middle step portion 258S2 and a bottom wall upper step portion 258S3 as substantially the same height as the channel outer side wall 256, and channel inner side wall 262 extending downwardly from the bottom wall upper step portion 258S3. The middle step portion 258S2 includes the at least one air admission opening 252 in the form of a closely spaced series of discrete air passing holes 252, preferably extending along the full circumference. There are breaks in this series of holes 252 in which screw passing openings 264 are provided through which screws 266 pass into the seat bench 310 to mount the looped channel 250. There are also corrugations along the looped channel 250 for greater structural strength. An odor containment flap 270, preferably formed of a resilient material such as rubber, is secured to the bottom surface of the bottom wall lower step portion 258S1 and protrudes inwardly into close proximity to form an air admitting gap AG with the downwardly protruding channel inner side wall 262. Odor containment flap 270 is positioned directly above the toilet bowl rim 20R, and the tubular liner 22 passes between the bowl rim 20R and the odor containment flap 270 as it feeds into the bowl 20.

As the blower 280 draws air from within the looped channel 250 and delivers it into the discharge duct 242, air is drawn into the looped channel 250 from the interior of the toilet bowl 20 through the air gap AG. The odor containment flap 270 helps prevent liquids from entering the looped channel 250 and prevents any air back-flow into the bowl 20.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A waterless toilet, comprising;
   a toilet bowl having a bowl upper opening and a bowl lower opening, a feed mechanism having a feed mechanism receiving opening in fluid communication with said bowl lower opening and having a feed mechanism dispensing opening, and a drive motor drivably connected to said feed mechanism and electrically connected to an electric power source, and a collection container having a collection container receiving opening in fluid communication with said feed mechanism dispensing opening;
   and a flexible tubular liner for feeding into said bowl upper opening and through said toilet bowl and thereby lining said toilet bowl, and then out of said bowl lower opening and into said feed mechanism receiving opening, and through said feed mechanism, which progressively draws said flexible tubular liner through the toilet bowl and feed mechanism when said feed mechanism is activated, and out of said feed mechanism dispensing opening, through said collection container receiving opening and into said collection container;
   wherein said feed mechanism comprises:
   an upright first end plate and an upright second end plate;
   roller axles extending between and mounted to said first and second end plates;
   adjacent first and second roller sets, wherein said first roller set comprises a first upper roller and a first lower roller extending below and substantially parallel to said upper roller, and said second roller set comprises a second upper roller and a second lower roller extending below and substantially parallel to said second upper roller, said upper and lower rollers extending substantially horizontally and being rotatably mounted on respective said roller axles between said first and second end plates; and
   a first feed belt extending around said first roller set and a second feed belt extending around said second roller set, said first and second feed belts having first and second belt outward surfaces with outwardly projecting and generally longitudinal belt feed fins which abut a corresponding said feed fin on the opposing said first or second belt to engage and draw said flexible tubular liner and any solid waste within said liner through said feed mechanism as said first and second feed belts are rotated by said drive motor;
   wherein said motor is activated to flush the toilet, said motor rotating said rollers which rotate said drive belts to advance waste through said feed mechanism.

2. The waterless toilet of claim 1, additionally comprising a drive shaft with a hex head end, gear caps and a gear box and a motor housing, wherein said motor is drivably connected to one of said gear caps through said gear box and said drive shaft; wherein said motor and said gear box are contained within said motor housing;
   and a power cord extending from said motor to a power cord connection extending through said housing.

3. The waterless toilet of claim 1, wherein said first and second feed belts each have a drain end, and wherein said feed fins are angled relative to the rotational axes of the corresponding said rollers about which said belts rotate, to guide waste liquid to flow down said feed fins to said drain ends of said belts, adjacent to which each said feed fin has a drain notch through which waste liquid drains from said feed mechanism and into said waste collection chamber.

4. The waterless toilet of claim 3, wherein said tubular liner has an inner surface, comprising a toilet valve formed by a combination of said drain notches at the ends of said feed fins at the drain ends of said belts and said tubular liner, and said tubular liner has an inner surface, wherein said tubular liner is a flexible, such that when waste liquid coats the inner surface of said tubular liner, the waste liquid surface tension causes opposing regions of the inner surface of said tubular liner to releasably cling to each other, closing said drain notch, and forming a barrier to the passage of air and odors, and such that when waste liquid is delivered into said bowl, it flows over said tubular liner inner surface and down areas of said tubular liner along said feed fins abutting the liner to the location of said drain notches, and the weight of the waste liquid causes the clinging areas of the tubular liner o separate and thereby open said toilet valve to the flow until the flow stops, whereupon this surface tension causes the opposing regions of said tubular tube liner to again cling to each other, thereby closing said toilet valve to prevent the escape of odors.

5. The waterless toilet of claim 2, wherein each said feed belt has a belt inward surface with longitudinal belt drive ribs, and each roller includes a roller cylinder with a cylinder outward surface from which roller drive ribs protrude, which engage and mesh with corresponding said belt drive ribs.

6. The waterless toilet of claim 1, wherein said end plates are interconnected at their upper ends by two horizontal and generally parallel first and second struts extending between said end plates, said struts being spaced apart to define between them a feed mechanism receiving opening through which said tubular liner and any waste it contains passes.

7. The waterless toilet of claim 1, wherein said toilet bowl comprises a bowl mounting channel member which is affixed to said first and second end plates and extends around a central portion of the waste passing space between said struts, wherein said toilet bowl has a funnel-shaped bowl upper portion and an annular bowl lower portion and said bowl lower portion has an inwardly protruding bowl mounting rib which releasably snaps into said bowl mounting channel member.

8. The waterless toilet of claim 5, wherein each said roller comprises a disk-shaped first retainer cap secured to a first cylindrical end of said roller, and a second retainer cap secured to a second cylinder end and protruding radially outward beyond the roller cylinder to retain the corresponding said feed belt against advancement off the roller ends and into contact with one of said first and second end plates.

9. The waterless toilet of claim 8, wherein a first retainer cap of each of said first and second lower rollers is a gear cap having gear teeth extending radially outward for engaging the gear cap of the adjacent said lower roller and engaging a drive gear propelled by said drive motor, each said roller cylinder containing a longitudinal axle passageway through which its roller axle is rotatably fitted, such that said roller is rotatable about its roller axle, and the roller axle has axle protruding ends which protrude outwardly beyond the roller cylinder ends and beyond the retainer cap, and wherein the axle protruding ends each terminate in a multi-sided engagement structure configured as a polygon with parallel opposing pairs of polygon faces.

10. The waterless toilet of claim 2, wherein each said gear cap comprises a double gear assembly for causing opposing feed fins of said first and second feed belts to always meet each other, said double gear assembly including a first cap gear having smaller gear teeth and a second cap gear having longer flat gear teeth and being laterally adjacent to and fixedly connected to said first gear cap, said first cap gear and said second cap gear of one gear cap simultaneously meshing with said first cap gear and said second cap gear of the adjacent said gear cap.

11. The waterless toilet of claim 1, wherein said electric drive motor, causes a drivably engaged lower roller to rotate, which in turn rotates the opposing said lower roller and first and second feed belts to thereby rotate said upper rollers, and wherein said roller sets rotate in opposing directions, such that the segments of said first and second feed belts passing between said roller sets both advance downwardly at the same speed to draw said tubular liner through said feed mechanism.

12. The waterless toilet of claim 1, wherein each said end plate has two opposing upper roller axle channels and two opposing lower roller axle channels recessed into the given said end plate, each said roller axle channel extending from a channel open end at a plate side edge inwardly and upwardly to a downward bend in the channel forming a channel corner and a channel end segment around the channel corner, terminating in a channel closed end, and said hex head end of a corresponding roller axle is sized to fit closely into a corresponding axle channel open end and is slidable along the axle channel, around the channel corner and into the channel end segment, which securely but removably retains the axle crown, and finally abuts the channel closed end, and the sides of the axle channel are spaced relative to the width of flat faces of the hex head end to engage and constrain the hex head end and thus the roller axle against rotation relative to said first and second end plates, wherein the channel closed ends for each roller set are farther apart than the corresponding channel open ends, such that when said hex head ends of said axles of the upper and lower rollers of a given roller are inserted into the corresponding said upper and lower channels, said axles progressively move apart from each other as said hex head ends are advanced along their respective channels and around the channel corners into the respective channel end segments, and such that their progressive separation gradually tightens the given said feed belt around its respective roller set until the feed belt is fully taut.

13. The waterless toilet of claim 8, additionally comprising a roller centering mechanism at each end of each said roller for centering the given said roller between said end plates, while said hex head end rides within its channel, wherein said roller centering mechanism comprises a spring member in the form of a resilient tab cut out of the given said end plate on three sides, and said resilient tab bows inwardly against an adjacent roller retainer cap, and the resilience of the opposing said tabs keeps each roller centered between said end plates.

14. The waterless toilet of claim 9, additionally comprising an anti-muncher, for preventing said tubular liner from becoming caught between meshing gear teeth on said gear caps as said tubular liner advances downwardly between said first and second feed belts, thereby preventing tearing of said tubular liner as it feeds, each said anti-muncher comprising first and second arched gear shield segments having substantially L-shaped cross-sections to fit around and cover the sides and peaks of the gear teeth, and are interconnected by an interconnection link portion, said anti-muncher being secured to the adjacent said first end plate.

15. The waterless toilet of claim 1, wherein said feed mechanism is enclosed by a box-shaped toilet housing, said toilet housing comprising a housing side wall and a generally horizontal housing top panel defining a seat bench, said seat bench having a seat bench opening through which liquid and solid waste pass into the toilet bowl, said toilet housing further comprising a housing bottom wall which has a central waste passing bottom wall opening and protruding forwardly from said housing side wall to define a foot panel.

16. The waterless toilet of claim 15, wherein said toilet housing is elevated on housing legs such that said collection chamber can be slid and pass underneath said housing until said seat bench opening registers with said collection chamber opening, and said collection chamber can be readily removed and emptied when full.

17. The waterless toilet of claim 7, additionally comprising a vented module secured to the underside of said seat bench for extracting odors from inside said toilet bowl and delivering such odors into a discharge duct which carries the odors away from the toilet, said vented module comprising a looped channel sized and shaped to follow the rim of said toilet bowl and having at least one air admission opening, said rim comprising a rim cuff which curves back around said bowl to provide a smooth upper surface over which said tubular liner can ride as it feeds into said bowl, said looped channel having a channel segment forming one of a fan mounting region and a blower mounting region with a blower mounting port into which a blower is mounted to evacuate air and odors from said toilet bowl through said looped channel and into a discharge duct;

wherein said vented module is secured to the underside of said toilet seat bench such that said vented module encircles said seat bench opening and the height of said seat bench relative to the height of said toilet bowl rim spaces the vented module a distance above said rim, said looped channel having an open channel top which is covered by said seat bench to become a looped passageway, said looped channel having at least one air admission opening.

18. A waterless toilet, comprising:
  a toilet bowl having a bowl upper opening and a bowl lower opening, a feed mechanism having a feed mechanism receiving opening in fluid communication with said bowl lower opening and having a feed mechanism dispensing opening, and a drive motor drivably connected to said feed mechanism and electrically connected to an electric power source, and a collection container having a collection container receiving opening in fluid communication with said feed mechanism dispensing opening;
  and a flexible tubular liner for feeding into said bowl upper opening, and through said toilet bowl and thereby lining said toilet bowl, and then out of said bowl lower opening and into said feed mechanism receiving opening, and through said feed mechanism which progressively draws said flexible tubular liner through the toilet bowl and feed mechanism when said feed mechanism is activated, and out of said feed mechanism dispensing opening, through said collection container receiving opening and into said collection container, wherein said feed mechanism comprises:
    an upright first end plate and an upright a second end plate;
    first and second roller axles extending between and mounted to said first and second end plates;
    a first roller and a second roller positioned horizontally and adjacent and mutually parallel to each other and rotatably mounted on respective said first and second roller axles, said first and second rollers being rotated by one of a drive motor connected to an electric power source and a hand crank, and thereby advancing said flexible tubular liner through said toilet bowl and through said feed mechanism and into said collection container;
    wherein one: of said motor is activated to flush the toilet, said motor rotating said rollers to advance said tubular liner and any waste within said tubular liner through said feed mechanism and said hand crank is rotated to flush the toilet, said hand crank is operated to rotate said rollers to advance said tubular liner and any waste within said tubular liner through said feed mechanism; and
  a vented module secured relative to said toilet bowl to extract odors from inside said toilet bowl and to deliver such odors into a discharge duct which carries the odors away from the toilet, said vented module comprising a looped channel sized and shaped to follow the rim of said toilet bowl and having at least one air admission opening, and said looped channel having a channel segment forming one of a fan mounting region and a blower mounting region with a mounting port into which one of a fan and a blower is mounted to evacuate air and odors from said toilet bowl through said looped channel and into said discharge duct.

19. The waterless toilet of claim 18, wherein said channel bottom wall has a channel wall bottom surface, additionally comprising an odor containment flap secured to said channel wall bottom surface and protruding inwardly to form an air admitting gap with said downwardly protruding channel inner side wall, said odor containment flap being positioned directly above said toilet bowl rim, wherein said tubular liner passes between said toilet bowl rim and said odor containment flap as it feeds into said bowl;
  such that, as said blower draws air from within said looped channel and delivers the air into said discharge duct, air is drawn into said looped channel from the interior of said toilet bowl through said air gap, and said odor containment flap inhibits liquids from entering said looped channel and prevents air back-flow into said toilet bowl.

20. A waterless toilet, comprising:
  a toilet bowl having a bowl upper opening and a bowl lower opening, a feed mechanism having a feed mechanism receiving opening in fluid communication with said bowl lower opening and having a feed mechanism dispensing opening, and one of a hand crank and a drive motor electrically connected to an electric power source drivably connected to said feed mechanism, and a collection container having a collection container receiving opening in fluid communication with said feed mechanism dispensing opening;
  and a flexible tubular liner for feeding into said bowl upper opening and through said toilet bowl and thereby lining said toilet bowl, and then out of said bowl lower opening and into said feed mechanism receiving opening, and through said feed mechanism, which progressively draws said flexible tubular liner through the toilet bowl and feed mechanism when said feed mechanism is activated, and out of said feed mechanism dispensing opening, through said collection container receiving opening and into said collection container;
  wherein said feed mechanism comprises:
    an upright first end plate and an upright second end plate;
    roller axles extending between and mounted to said first and second end plates;
    adjacent first and second roller sets, wherein said first roller set comprises a first upper roller and a first lower roller extending below and parallel to said upper roller, and said second roller set comprises a second upper roller and a second lower roller extending below and parallel to said second upper roller, said upper and lower rollers extending horizontally and being rotatably mounted on respective said roller axles between said first and second end plates;
    a first feed belt extending around said first roller set and a second feed belt extending around said second roller set, said first and second feed belts having first and second belt outward surfaces with outward projections which abut a corresponding said protrusion on the opposing said first or second belt to engage and draw said flexible tubular liner and any solid waste within said liner through said feed mechanism as said first and second feed belts are rotated by one of said drive motor and said hand crank; and
    wherein one of said motor is activated and said hand crank is rotated to flush said toilet, one of said motor and said hand crank rotating said rollers which rotate said drive belts to advance waste through said feed mechanism.

\* \* \* \* \*